US010268600B2

(12) United States Patent
Gaur et al.

(10) Patent No.: US 10,268,600 B2
(45) Date of Patent: Apr. 23, 2019

(54) SYSTEM, APPARATUS AND METHOD FOR PREFETCH-AWARE REPLACEMENT IN A CACHE MEMORY HIERARCHY OF A PROCESSOR

(71) Applicant: Intel Corporation, Santa Clara, CA (US)

(72) Inventors: Jayesh Gaur, Bangalore (IN); Sreenivas Subramoney, Bangalore (IN); Sanjay Ganapathy, Kilpauk (IN)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 15/701,795

(22) Filed: Sep. 12, 2017

(65) Prior Publication Data

US 2019/0079877 A1     Mar. 14, 2019

(51) Int. Cl.
*G06F 12/0862* (2016.01)
*G06F 12/126* (2016.01)
*G06F 12/128* (2016.01)
*G06F 12/0811* (2016.01)

(52) U.S. Cl.
CPC ........ *G06F 12/126* (2013.01); *G06F 12/0811* (2013.01); *G06F 12/0862* (2013.01); *G06F 12/128* (2013.01); *G06F 2212/602* (2013.01); *G06F 2212/62* (2013.01)

(58) Field of Classification Search
None
See application file for complete search history.

(56) References Cited

U.S. PATENT DOCUMENTS

| 10,013,326 | B2* | 7/2018 | Martinez ............. G06F 11/3409 |
| 2013/0166846 | A1 | 6/2013 | Gaur et al. |
| 2014/0297965 | A1* | 10/2014 | Jayaseelan .......... G06F 12/0862 711/137 |
| 2014/0351524 | A1 | 11/2014 | Natarajan et al. |
| 2014/0368524 | A1 | 12/2014 | Srinivasan et al. |
| 2015/0378919 | A1* | 12/2015 | Anantaraman ..... G06F 12/0862 711/122 |
| 2016/0041914 | A1* | 2/2016 | Eckert ................. G06F 12/0862 711/137 |

OTHER PUBLICATIONS

Jayesh Gaur, et al., "Bypass and Insertion Algorithms for Exclusive Last-level Caches," 12 pages, ISCA'11, Jun. 8, 2011, San Jose, California, USA.
Samira Khan, et al., "Sampling Dead Block Prediction for Last-Level Caches," 12 pages, Appears in Proceedings of the 43rd Annual IEEE/ACM International Symposium on Microarchitecture (MICRO-43), Dec. 2010.

* cited by examiner

*Primary Examiner* — Brian R Peugh
(74) *Attorney, Agent, or Firm* — Trop, Pruner & Hu, P.C.

(57) ABSTRACT

In one embodiment, a processor includes: a first cache controller to control a first cache memory. This cache controller may include a replacement circuit to: associate a first priority indicator with a first cache line based on storage of demand data in the first cache line and first learning information associated with a set of demand-based categories of cache lines; and associate a second priority indicator with a second cache line based on storage of prefetch data in the second cache line and second learning information associated with a set of prefetch-based categories of cache lines. Other embodiments are described and claimed.

20 Claims, 17 Drawing Sheets

SYSTEM, APPARATUS AND METHOD FOR PREFETCH-AWARE REPLACEMENT IN A CACHE MEMORY HIERARCHY OF A PROCESSOR

TECHNICAL FIELD

Embodiments relate to control of a cache memory hierarchy of a processing device.

BACKGROUND

Memory, and more specifically latency in accessing memory, continues to limit the performance of modern processors. One way to mitigate high memory latency is to use a cache memory hierarchy within a processor. Another technique to hide memory latency is to prefetch cache lines into this cache hierarchy. Typically, a prefetch request is handled prior to the arrival of an actual demand request. As a result, subsequent demand requests from a core may hit the prefetched cache line in the core caches.

However prefetching and replacement policies are not necessarily synergistic. Replacement policies are designed to retain cache lines that have low reuse distance, defined as the average time between consecutive accesses to the same cache line. However, inefficiencies of current cache replacement policies can still lead to delays in accessing data.

DETAILED DESCRIPTION

Figure 1:
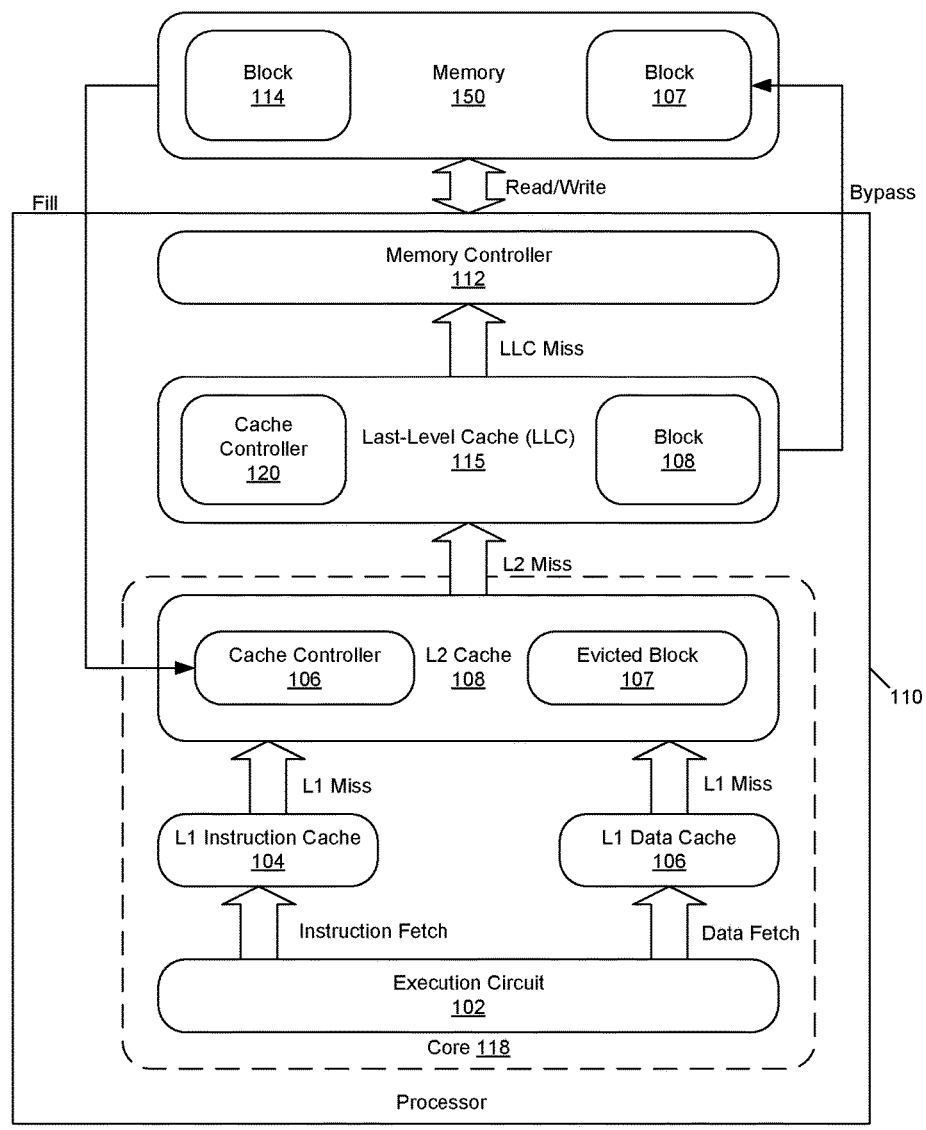
FIG. 1 is a block diagram of a portion of a system in accordance with an embodiment.

In various embodiments, a cache replacement policy may include techniques to control a last level cache (LLC) or other cache memory of a cache memory hierarchy to only retain those cache lines that cannot be prefetched, or a cache line where a prefetch is not timely enough to hide all (or substantially all) the memory latency. With these techniques, any cache line that is easily prefetchable may be controlled to not be retained in the LLC, even if its reuse distance would typically dictate that it is to be retained according to a conventional replacement policy. Embodiments may leverage these techniques in connection with a dead block prediction LLC replacement algorithm.

Replacement policies try to retain cache lines with low reuse distance, in order to maximize hit rate. However many of these cache lines may be readily or easily prefetchable, and hence retaining these cache lines may not improve performance, although it may improve LLC hit rate. This is so in cases where cache lines having low reuse distance are also easily prefetchable. In that case, irrespective of a hit or miss in the cache, a prefetcher such as a hardware prefetcher of the processor would be able to successfully prefetch the cache line and no performance gains will be seen by retaining such cache lines in the LLC. On the other hand, a cache line having a high reuse distance that is not prefetchable may be controlled to be retained in the LLC. Embodiments thus allocate higher priority to cache lines that cannot be prefetched. Even though this allocation reduces the overall hit rate for a LLC, performance may improve.

In an embodiment, a plurality of observer sets of the LLC may be used to learn reuse behavior. In another embodiment, as a mid-level cache (MLC) generally maps to the LLC (e.g., each MLC set corresponds to X LLC sets (where the LLC has more sets than the MLC)), observer sets may be in the MLC. In one particular embodiment, 32 sets of the MLC (which may have between approximately 1024 and 2048 sets) may be allocated as observer sets. When an eviction occurs from a mid-level cache (MLC) (both clean and dirty evictions), the cache line is classified into one of a plurality of bins. In one embodiment, there may be 8 different bins as follows:

1. Bin [0]: cache lines that were filled by prefetch requests in the MLC, are not hit in the MLC and are evicted to the LLC. Such cache lines may correspond to bad or early prefetches.
2. Bin [1][0]: cache lines that were filled by demand requests. These cache lines may be controlled to be cached in the LLC, as the prefetch was not able to latch onto them. Embodiments seek to prioritize these lines to stay in the LLC.
3. Bin [2][0]: cache lines that were filled by demand requests but modified by a dirty L1 cache write back. These lines may be prioritized in the LLC as they were filled by demand request.
4. Bin [3][0]: cache lines filled by demand requests and hit multiple times by demand requests. Since these lines were filled by demand, they may be prioritized in the LLC.
5. Bin [1][1]: cache lines filled by prefetch requests and hit by demand requests later on. These lines are prefetchable, and hence are less important for LLC caching.

6. Bin [2][1]: cache lines filled by prefetch requests and written to by L1 cache write back.
7. Bin [3][1]: cache lines filled by prefetch requests but hit multiple times by demand requests.
8. Bin [4]: cache lines that were filled from the LLC, namely cache lines that see a reuse and hence respond to caching. Embodiments may give these lines the highest priority to stay in the LLC.

For each of the identified bins or categories, a liveness value may be determined, which is defined as the fraction of lines of a given bin that are recalled. For each bin, a plurality of counters may be maintained. In one embodiment, a first counter, referred to as a dead counter (D), may be configured to be incremented every time an eviction from an MLC observer set occurs that belongs to the given bin, b. A second counter, referred to as a live counter (L), may be configured to be incremented whenever a subsequent read request hits the LLC to a cache line that was filled by a prior MLC eviction of bin b. In certain embodiments, the bin information is stored in observer sets of the LLC and each cache line in the MLC may also store its bin information.

In an embodiment, when an MLC cache line eviction occurs from a non-observer set, the counters associated with the bin with which the cache line is associated may be accessed. These counts may be analyzed in a given manner such as determination of a difference or ratio of the dead count to the live count, or another such comparison. A result of this analysis may be used in making an LLC replacement determination, such as whether the evicted line is to be stored in the LLC (in turn evicting an existing LLC cache line) or bypassing storage in the LLC of the MLC-evicted cache line.

In an example, this comparison result (e.g., a difference) can be compared to a threshold and, if the value is less than the threshold, the line is either bypassed from storage in the LLC (in an exclusive cache hierarchy) or a dead hint is associated with the line (in an inclusive cache hierarchy) to control position of storage in the LLC.

Using an embodiment as described herein, effectively cache lines that are brought in by demand requests (and not through prefetches) are given a very low priority of bypass as compared to cache lines that were filled by prefetch requests. Stated another way, demand-based data has a higher priority for storage in the LLC than for prefetch-based data. In this way, an LLC replacement policy is biased to evict cache lines that are prefetchable and retain cache lines that are not prefetchable. Note that cache lines identified as being filled to lower level caches from the LLC (namely bin [4] cache lines) are not bypassed and/or associated with a dead hint.

Referring now to FIG. 1, shown is a block diagram of a portion of a system in accordance with an embodiment. More specifically, FIG. 1 shows a portion of a system 100 including at least a portion of a processor 110 and a memory 150. Processor 110 may be a system on chip (SoC) or other multicore processor, and system memory 150 may be implemented as a dynamic random access memory (DRAM). Understand of course that additional components will be present in a given system, and system 100 is shown at a high level to show the general flow of data between multiple levels of a memory hierarchy of the system, including multiple cache memory levels within a processor and its system memory.

As seen, processor 100 includes an execution circuit 102, an L1 instruction cache 104, an L1 data cache 106, an L2 cache 108, a LLC 115, and a memory controller 112. Execution circuit 102 may be a portion of a processor configured to execute instructions. In some implementations, a processor may have multiple cores, with each core having a processing unit and one or more caches. FIG. 1 illustrates a three-level cache hierarchy in which L1 caches 104 and 106 are closest to execution circuit 102, L2 cache 108 is farther from execution circuit 102 compared to L1 caches 104 and 106, and LLC 115 is the farthest from execution circuit 102.

In operation, execution circuit 102 may perform an instruction fetch after executing a current instruction. The instruction fetch may request a next instruction from L1 instruction cache 104 for execution by execution circuit 102. If the instruction is present L1 instruction cache 104, an L1 hit may occur and the next instruction may be provided to execution circuit 102 from L1 instruction cache 104. If not, an L1 miss occurs, and L1 instruction cache 104 may request the next instruction from L2 cache 108.

If the next instruction is in L2 cache 108, an L2 hit occurs and the next instruction is provided to L1 cache 104. If not an L2 miss occurs, and L2 cache 108 may request the next instruction from LLC 115.

If the next instruction is in LLC 115, an LLC hit occurs and the next instruction is provided to L2 cache 108 and/or to L1 instruction cache 104. If not, an LLC miss may occur and LLC 115 may request the next instruction from memory controller 112. Memory controller 112 may read a block 114 that includes the next instruction and fill block 114 into L2 cache 108, in a non-exclusive cache hierarchy implementation. Other fill techniques of course are possible. And understand that while an instruction-based cache fill example is given, the same operations occur for a data-based fill (with the exception that the data is finally filled back to L1 data cache 106).

In some implementations, a core 118 may include execution circuit 102 and one or more of caches 104, 106, or 108. For example, in FIG. 1, core 118 includes caches 104, 106, and 108 but excludes LLC 115. In this example, LLC 115 may be shared with other cores. As another example, if core 118 includes LLC 115, LLC 115 may be private to core 118. Whether LLC 115 is private to core 118 or shared with other cores may be unrelated to whether LLC 115 is inclusive or exclusive of other caches, such as caches 104, 106, or 108.

As described further herein and illustrated in a high level in FIG. 1, L2 cache 108 includes a cache controller 106. In embodiments, cache controller 106 may be configured to maintain statistics (including but not limited to counter information) for multiple bin categories, including independent bin categories for prefetch-based and demand-based data. In addition, cache controller 106 may, upon identification of an eviction candidate (namely a given cache line such as block 107), determine a priority indicator to be associated with the eviction candidate based at least in part on statistical information of a bin with which the eviction candidate is associated. In turn, upon an eviction cache controller 106 may send an eviction notification message including an identification of this cache line and its associated priority indicator to LLC 115.

As further illustrated, LLC 115 includes a cache controller 120 that may be configured to bias maintenance of demand-based data in LLC 115 over maintenance of prefetch-based data. To this end, based at least in part on a priority indicator associated with an incoming cache line, cache controller 120 may determine, whether to store the incoming evicted cache line at all, and if so, to determine an appropriate priority for the storage (e.g., corresponding to a particular age indicator for the cache line) so that LLC 115 may more readily maintain demand-based data over prefetch-based data.

If a priority indicator provided with an evicted cache line is received in LLC 115 that is of a low level, in some embodiments cache controller 120 may determine to bypass storage of the cache line (e.g., as shown at block 107). Instead, this cache line may be bypassed and sent directly to memory 150 to be stored in a data line as block 107. While a separate channel is shown to couple between LLC 115 and memory 150, understand this is for purposes of illustration. Typically, a bypass path from LLC 115 proceeds through memory controller 112 and thereafter to memory 150. Understand while shown at this high level in FIG. 1, many variations of a cache hierarchy and its components may be present.

Figure 2:
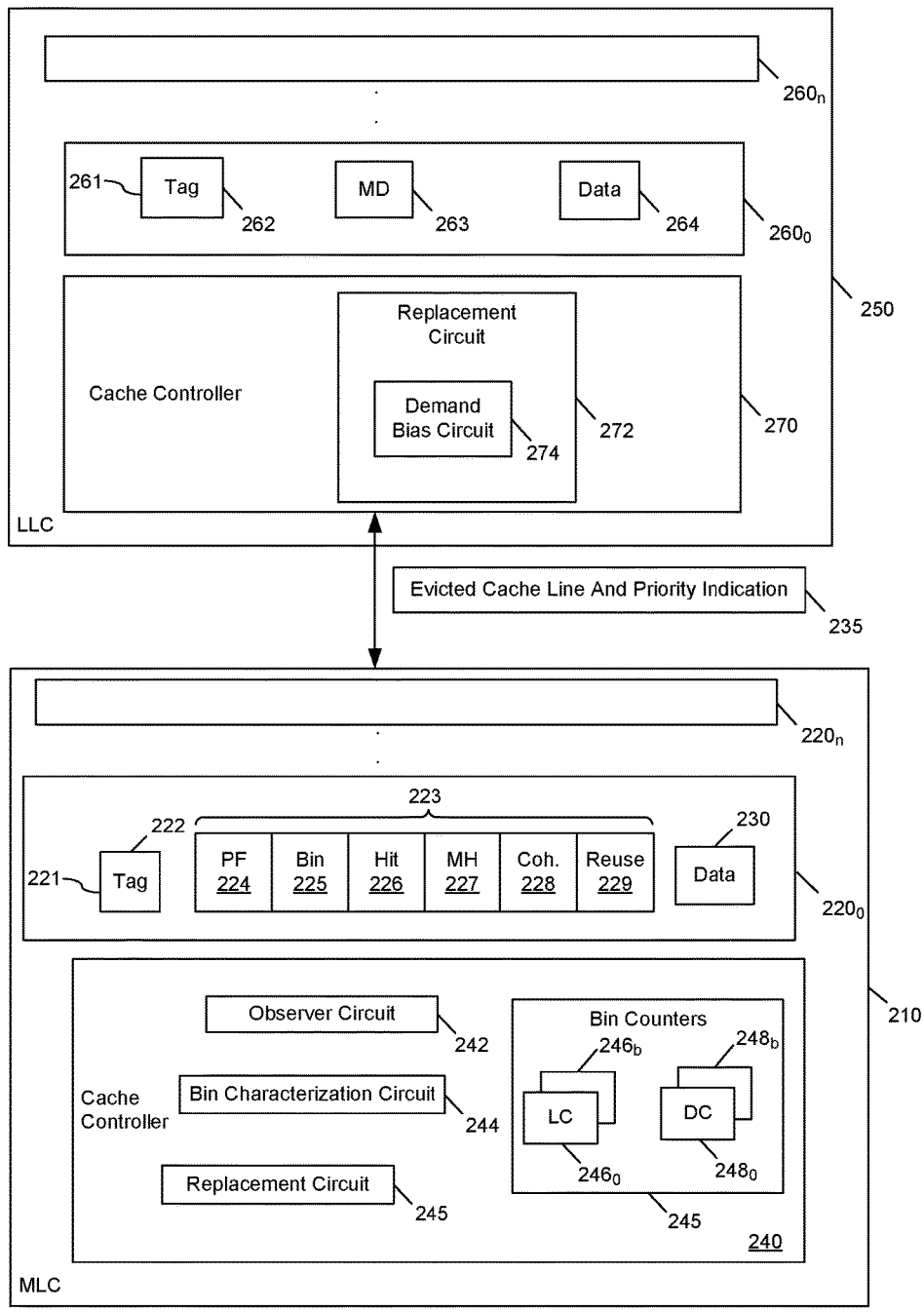
FIG. 2 is a block diagram of a portion of a cache hierarchy in accordance with an embodiment of the present invention.

Referring now to FIG. 2, shown is a block diagram of a portion of a cache hierarchy in accordance with an embodiment of the present invention. More specifically FIG. 2 shows further details of two levels of a multi-level cache hierarchy, with included circuitry for performing prefetch-aware evictions and insertions as described herein. As seen, a cache hierarchy 200 includes two levels of cache memory, namely a mid-level cache (MLC) 210 and a LLC 250. Understand while only two levels of a hierarchy are shown, more than two levels may be present in other embodiments. As in FIG. 1 above, typically a processor may include at least three levels of cache hierarchy, including a L1 cache that is smallest and closest to a core or other processing unit, a second level cache (such as MLC 210) and a shared or last level cache, such as LLC 250.

For purposes of discussing the prefetch-aware replacement techniques described herein, reference may be made to MLC 210. As seen, MLC 210 includes various metadata or status information regarding its cache lines that may be used by a corresponding cache controller included in or associated with MLC 210 to identify cache lines that are more suitable for maintenance in LLC 250. More specifically as illustrated in FIG. 2, MLC 210 includes a plurality of cache lines 221, a representative one of which is shown in detail in FIG. 2. In embodiments, MLC 210 may be implemented as an M-way N-set associative cache memory. Thus as illustrated, a plurality of sets $220_0$-$220_n$ are shown. Each such set may include a plurality of ways (e.g., M ways), each corresponding to a cache line 221. Representative details of information stored in cache line 221 are shown. Specifically, cache line 221 may include or be associated with a tag portion 222 that is used to index into the cache line. Cache line 221 further includes a metadata portion 223 including a plurality of fields and a data portion 230 that stores the corresponding data of the cache line. In the embodiment shown in FIG. 2, metadata portion 223 includes a prefetch field 224. As described herein, prefetch field 224 may, in an embodiment, store a single bit indicator to indicate whether the data of the cache line was brought into MLC 210 in response to a prefetch request or a demand request. In a particular embodiment, a set bit in prefetch field 224 indicates that the data was brought into MLC 210 in response to a prefetch request, while a reset bit in prefetch field 224 indicates that the data was brought into MLC 210 in response to a demand request. As described herein, this prefetch/demand status information may be used to identify a given initial bin association for the cache line such that independent learning can occur for prefetch and demand-based data.

As further illustrated in FIG. 2, metadata portion 223 also includes a bin field 225 that may store a bin identifier to identify a given bin with which cache line 221 is currently associated. As described herein, this bin identifier may be updated during storage of cache line 221 to reflect its hit status, reuse status and so forth. Metadata portion 223 may further include a hit field 226 to store a hit indicator that is set when cache line 221 is hit by a demand request from a lower level cache memory/core. In turn, a multiple hit field 227 may store an indicator to indicate that cache line 221 was hit multiple times during its storage in MLC 210. Metadata portion 223 further includes a coherency field 228 which may store information regarding a coherency status of cache line 221. In one particular embodiment, such coherency status may be a given one of multiple coherency states, e.g., in accordance with a MODIFIED, EXCLUSIVE, SHARED, INVALID (MESI) cache coherency scheme. Finally, metadata portion 223 may include a reuse field 229 that, when set, indicates that cache line 221 has been reused, namely that data of cache line 221 has been filled from LLC 250 (and thus is of a bin [4] category).

Still referring to FIG. 2, MLC 210 further includes a cache controller 240 that in embodiments may be a given hardware circuit, in addition to additional control logic, software and/or firmware to perform cache control operations with regard to storage of data in MLC 210. Furthermore as described herein, cache controller 240 may perform bin characterization operations, observation operations and provide priority information upon eviction of cache lines to enable LLC 250 to perform its replacement operations in a prefetch-aware manner.

To this end, cache controller 240 includes an observer circuit 242, a bin characterization circuit 244, and a replacement circuit 245. Understand while shown with these particular sub-circuits in the embodiment of FIG. 2, a given cache controller may include additional logic and circuitry. As further illustrated, cache controller 240 also includes bin counters 245. More specifically as described herein, a set of live counters $246_0$-$246_b$ and a set of dead counters $248_0$-$248_b$ may be included, with a corresponding live counter and dead counter associated with each of multiple bins.

In some implementations, counters 246, 248 may use saturation arithmetic, in which addition and subtraction operations may be limited to a fixed range between a minimum and maximum value. In saturation arithmetic, if the result of an operation is greater than the maximum it may be set ("clamped") to the maximum, while if it is below the minimum it may be clamped to the minimum.

A cache line that is evicted from MLC 210 may be classified as "live" if the block experiences at least one hit in LLC 250 between the time it is evicted from MLC 210 and the time it is evicted from LLC 250. Otherwise, e.g., if a cache line experiences no hits in LLC 250 between the time it is evicted from MLC 210 and the time it is evicted from LLC 250, the block is considered "dead." To illustrate, for a particular bin or category n and a multiplier X, if $D^n > (X * L^n)$, then the block may be considered "dead" and may therefore be a potential candidate for eviction from the LLC. This formula identifies categories that have a hit rate in the LLC that is bounded above by $1/(1+X)$. The average hit rate in the LLC for a bin n may be expressed as $L^n/(D^n + L^n)$. In some implementations, the multiplier X may be set to a particular number. For example, setting the multiplier X to 8 may result in a hit-rate bound of 11.1%. In some implementations, the value of X may be static whereas in other implementations the value of X may vary among the multiple categories, based on an execution phase associated with the block, based on other factors, or any combination thereof. In some implementations, the multiplier X may be different for at least two of the categories. For example, a multiple $X^n$ may be associated with each bin n.

In operation, observer circuit 242 may statistically identify a group of observer sets. In an embodiment, 32 observer sets may be identified in a statistical manner such that these sets are distributed across all sets of MLC 210 to ensure good representation characteristics. Observer circuit 242 may monitor performance of these observer sets to update corresponding live counters 246 and dead counters 248 as activity occurs within these observer sets for corresponding cache lines of particular bins. In turn, bin characterization circuit 244 may, based at least in part on information in a metadata portion of cache lines, characterize cache lines of MLC 210 to be of a given bin. In addition, bin characterization circuit 244 may update such bins as activity occurs within these cache lines.

Replacement circuit 245 may be configured to identify a replacement candidate (cache line) for eviction from a given set 220 based on a replacement policy. Furthermore, when an eviction candidate is identified, replacement circuit 245 may also determine a priority indication to indicate suitability of maintenance of the evicted cache line in LLC 250. As described herein, this priority indication may be based at least in part on an identified bin with which the cache line is associated, such that demand-based cache lines have a higher probability of being maintained in LLC 250.

As illustrated in FIG. 2, during operation MLC 210 may identify an evicted cache line and a priority indication for this cache line, and send a communication (message 235) to LLC 250. As illustrated, LLC 250 includes a plurality of sets $260_0$-$260_n$, each of which may include a plurality of ways, a representative way 261 being illustrated. LLC 250 may similarly be arranged as a set-associative cache memory. As with the cache lines within MLC 210, each cache line 261 may include a tag portion 262, a metadata portion 263, and a data portion 264. In some cases, at least some of the metadata information in metadata portion 223 of MLC 210 may be included in metadata portion 263. LLC 250 further includes a cache controller 270 to perform control activities with regard to LLC 250.

Of interest here, cache controller 270 may include a replacement circuit 272 configured, based on a given replacement policy, to identify an eviction candidate from a set when new information is to be stored in the set. To enable the prefetch-aware replacement techniques described herein, replacement circuit 272 may include a demand bias circuit 274, which may be configured, based at least in part on the priority indication received with an eviction notification from MLC 210, to identify whether to store such evicted cache line and if so with what priority, to thus bias maintenance of cache lines within LLC 250 for demand-based data. Understand while shown at this high level in the embodiment of FIG. 2, many variations and alternatives are possible.

Figure 3:
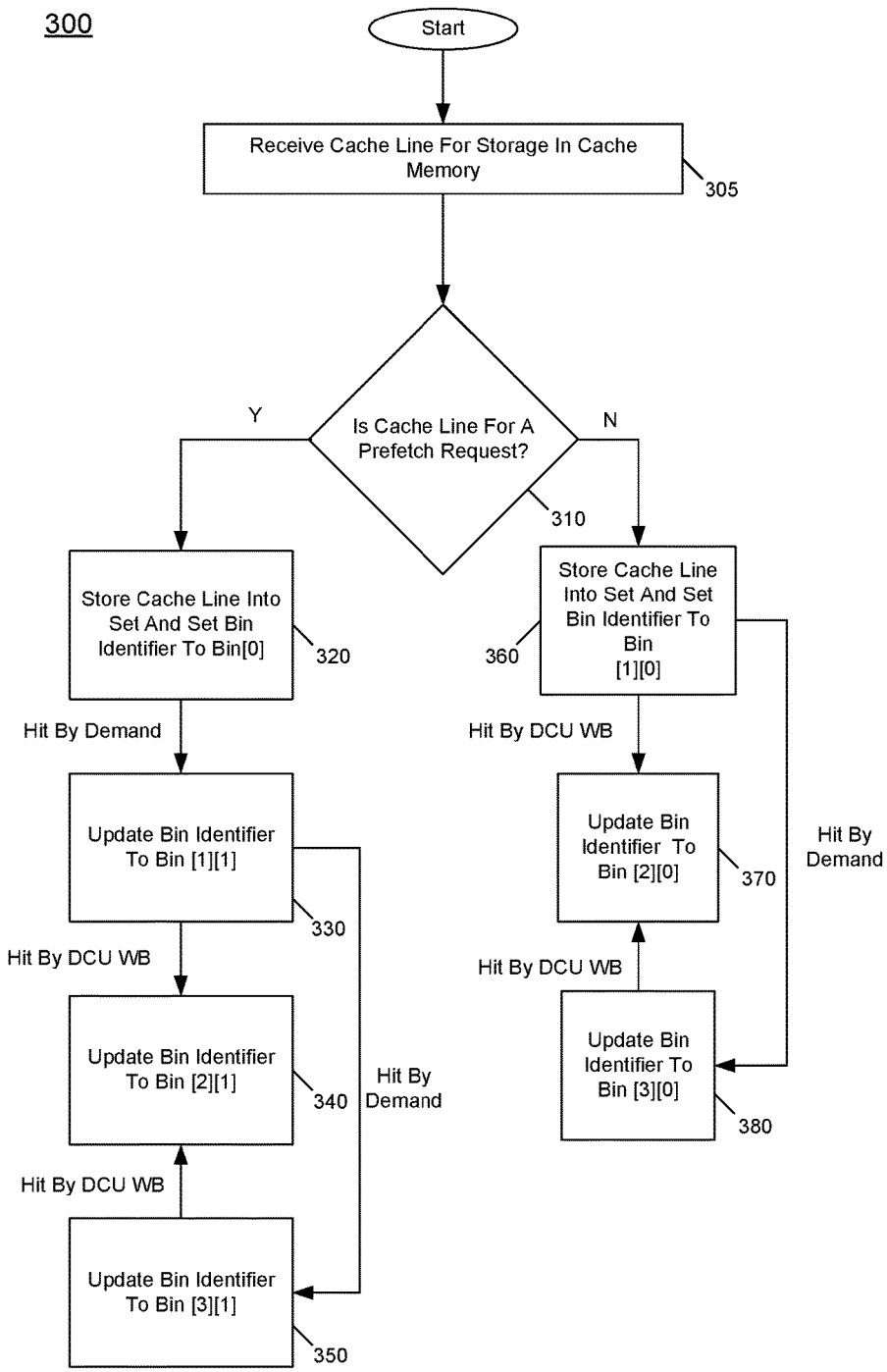
FIG. 3 is a flow diagram of a method in accordance with an embodiment of the present invention.

Referring now to FIG. 3, shown is a flow diagram of a method in accordance with an embodiment of the present invention. More specifically, method 300 illustrates a bin identification technique which may be performed, in an embodiment, by circuitry within or associated with an MLC. With reference back to FIG. 2, bin characterization circuit 244 may be configured to perform method 300. More specifically, method 300 is used to characterize, upon insertion of a cache line into the MLC, a given bin and then to update this bin as the cache line's status is updated during storage within the MLC. Understand that the separate paths shown in FIG. 3 for prefetch-based data and demand-based data enables independent learning of usage of demand-based and prefetch-based requests within a processor to enable more effective replacement decisions in a last level cache. More specifically, embodiments provide independent learning mechanisms for prefetchable and non-prefetchable requests, irrespective of their quality of caching and reuse distances.

As illustrated, method 300 begins at block 305 with receipt of a cache line for storage in the cache memory. In the embodiment of FIG. 3, assume that this cache memory is an MLC. When a cache line is received for insertion in the MLC, e.g., from a memory hierarchy, control passes to diamond 310 to determine whether this cache line is for a prefetch request. If so, control passes to block 320 where the cache line may be stored into a given set with which it is associated and have a bin identifier set to bin [0], which as shown above is an initial bin state for a cache line filled by a prefetch request. Then if this cache line is hit by a demand request while stored in the MLC, control passes to block 330 where the bin identifier may be updated to bin [1][1]. If this hit cache line is then again hit while maintained within the MLC by a write back (e.g., from a data cache unit (DCU)), control passes to block 330 where the bin identifier is updated to bin [2][1]. Should a prefetch-based cache line be hit by multiple demand requests, control passes from block 330 to block 350 where the bin identifier may be updated to bin [3][1]. In turn, should this multiply hit cache line then have a write back occur, its bin identifier may be updated to bin [2][1] at block 340. Thus for the independent prefetch branch, bin [3][1] is of highest prefetch priority and bin [0] is the lowest.

Still with reference to FIG. 3, instead if an incoming cache line is for a demand-based request, control passes from diamond 310 to block 360. There the cache line may be stored into a set of the cache memory and its bin identifier may be set to bin [1][0]. Should this demand-based request be hit by a write back while maintained in the MLC, control passes to block 370 where the bin identifier is updated to bin [2][0]. And if the cache line is hit by multiple requests, control passes from block 360 to block 380 where the bin identifier is updated to bin [3][0]. Should this multiply hit cache line then be hit by a write back, control passes from block 380 to block 370 where the bin identifier is updated to bin [2][0]. Thus for the independent demand branch, bin [3][0] is of highest demand priority and bin [1][0] is the lowest. Understand while particular bins are discussed and updates occur in this particular manner in the embodiment of FIG. 3, other prefetch-aware replacement schemes may include more or different bin values and further that updates to such bin values may occur in different manners.

Figure 4:
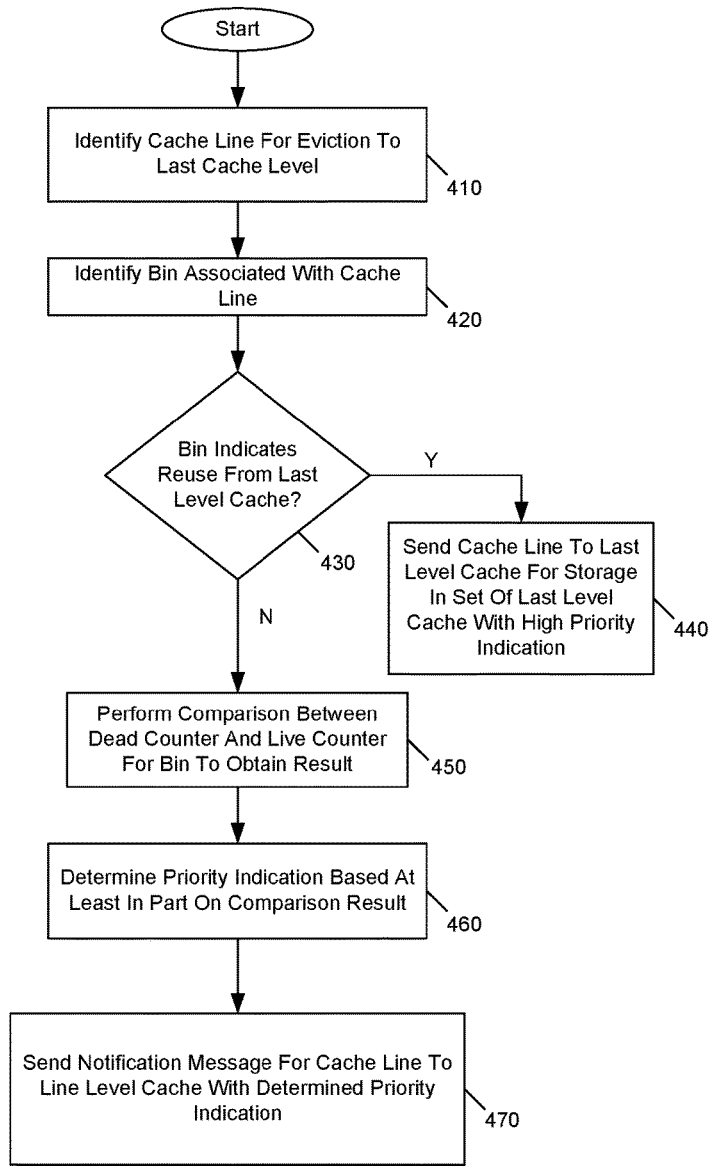
FIG. 4 is a flow diagram of a method in accordance with another embodiment of the present invention.

Referring now to FIG. 4, shown is a flow diagram of a method in accordance with another embodiment of the present invention. More specifically, FIG. 4 illustrates a method for identifying an eviction candidate in, e.g., a MLC and further determining a priority indication for this cache line. In an embodiment, this priority indication may be based at least in part on its bin and corresponding learning information for the bin, e.g., live and dead counters. In embodiments, method 400 may be performed by hardware circuitry, software, firmware and/or combinations thereof. As one particular example, method 400 may be performed by a cache controller of the MLC. As illustrated, method 400 begins by identifying a cache line for eviction to an LLC (block 410). Such eviction candidate may be identified according to a given replacement policy for the MLC. For ease of discussion, assume an age-based replacement scheme where cache lines of sets may proceed from a most recently used (MRU) position to a least recently used (LRU) position. Next control passes to block 470 where a bin associated with the cache line may be identified. In an embodiment, a bin identifier stored within a metadata portion of the cache line can be used to identify this bin. Next it is determined at diamond 430 whether this bin identifier indicates reuse from the last level cache. As discussed above in an embodiment, this determination may be based on a bin identifier having a value of bin [4]. If so, control passes to block 440 where the cache line is sent with a high priority indication to the last level cache for storage in a set of the last level cache with which this cache line is associated. Although different types of priority indications are possible, in one embodiment, a high priority indication may simply be an indication that the line is to be stored in a most recently used position of the set.

Still with reference to FIG. 4 instead if there is no reuse indicator, control passes to block 450. At block 450 a comparison can be performed between the dead counter and live counter for this bin to obtain a result. As discussed above, different comparisons are possible. Assuming an example where some type of weighted subtraction operation occurs, a result is obtained. Next, control passes to block 460 where a priority indication for the cache line can be determined based at least in part on this comparison result. For example, the cache line can be identified as high priority if this comparison result exceeds a threshold. In one case, there may be different thresholds for prefetch and demand-based bin categories. As an example, a threshold for demand-based bins may be zero such that if the comparison result is positive it exceeds the threshold and thus a high priority indication is set. Instead in this example if the comparison result is less than zero, the threshold is not exceeded and a low priority indication is set. In contrast, for prefetch-based bins the threshold may be set at a higher level. In any event, control passes to block 470 where a notification message is sent for the cache line to the LLC with the determined priority indication, to enable the LLC to perform a replacement operation, as appropriate based on this priority indication. Understand while shown at this high level in the embodiment of FIG. 4, many variations and alternatives are possible.

Figure 5:
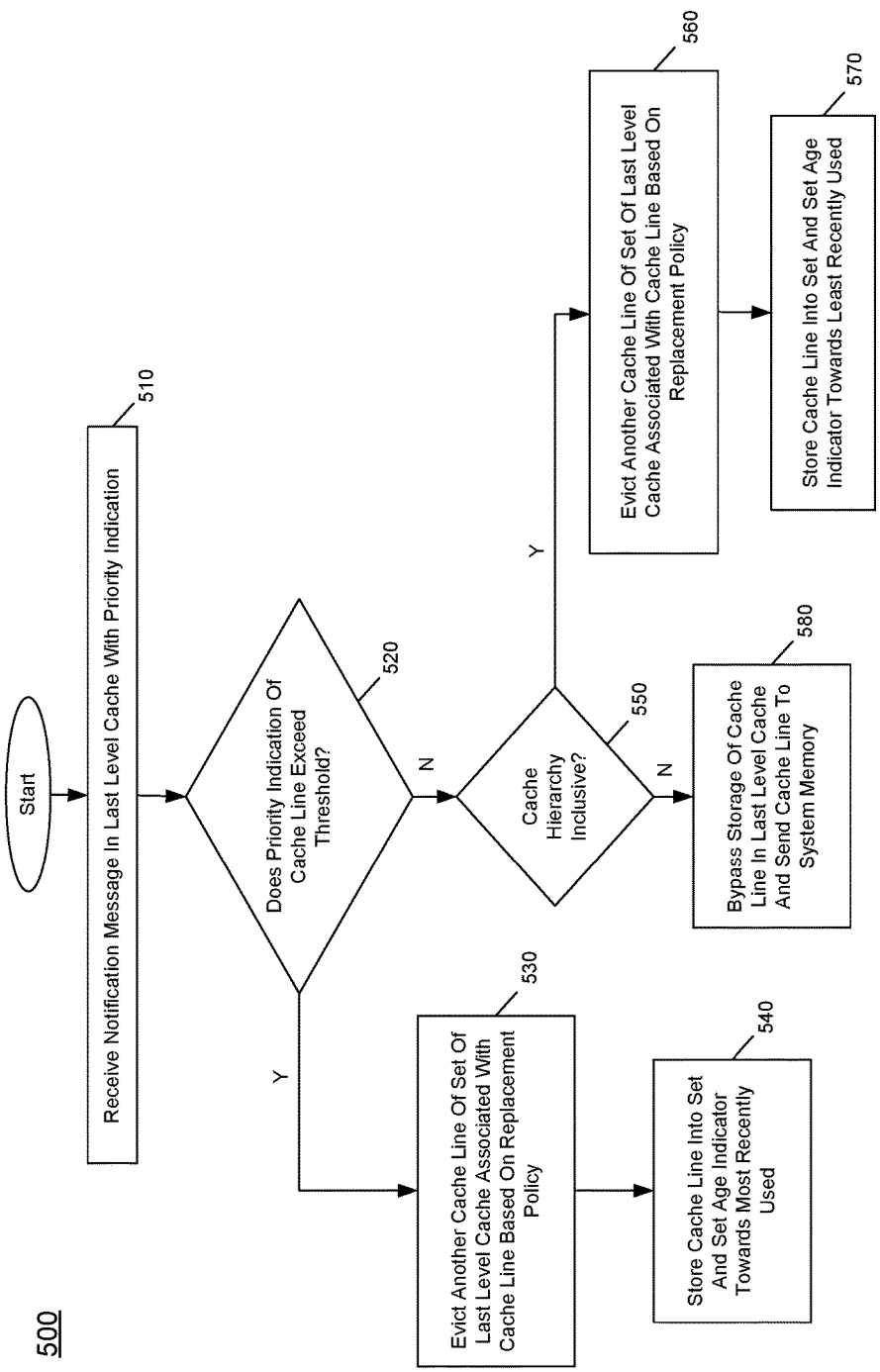
FIG. 5 is a flow diagram of a method in accordance with yet another embodiment of the present invention.

Referring now to FIG. 5, shown is a flow diagram of a method in accordance with another embodiment of the present invention. More specifically, method 500 of FIG. 5 may be used to handle replacement decisions in a LLC in a prefetch-aware manner as described herein. Method 500 may be performed, in different embodiments by hardware circuitry, software, firmware and/or combinations thereof. For example, method 500 may be performed by a cache controller of an LLC. As seen, method 500 begins by receiving a notification message in the LLC as to a cache line being evicted from the MLC, along with a priority indication for this cache line (block 510). From block 510, control passes to diamond 520 to determine whether the priority indication of the cache line exceeds a threshold. In a simple example, the priority indication is one of two levels, namely a high priority indication or a low priority indication, where in an age-based replacement technique the high priority indication corresponds to the MRU position and the low priority indication corresponds to the LRU position. In this case, the threshold may be set to low priority level. Of course in other examples, more than two priority levels may be indicated and similarly, more than two age-based positions may correspond to these priority indications.

In any event, if it is determined that the priority indication of the cache line exceeds a threshold (such as where the priority indication is a high priority indicator that exceeds the threshold), control passes to block 530 where another cache line of the set of the cache line with which the incoming cache line is associated may be evicted based on a given replacement policy. For example, the LRU position in this set may be evicted, e.g., to system memory. Thereafter, control passes to block 540 where the cache line may be stored into the set and an age indicator for this cache line can be set accordingly. In this high priority instance, this age indicator may be set towards the most recently used position. In a particular embodiment, this cache line may be stored into the most recently used position.

Still with reference to FIG. 5, if instead it is determined at diamond 520 that the priority indication does not exceed the threshold, such as where the priority indicator indicates a low priority, control next passes at diamond 550. At diamond 550 it is determined whether the cache hierarchy is an exclusive hierarchy. If so, control passes to block 560 where another cache line of the set of the cache line with which the incoming cache line is associated may be evicted based on a given replacement policy. Thereafter, control passes to block 570 where the cache line may be stored into the set and an age indicator for this cache line can be set accordingly. In this low priority instance, this age indicator may be set towards the least recently used position. In a particular embodiment, this cache line may be stored into the least recently used position.

Still with reference to FIG. 5, if the cache hierarchy is not inclusive, control passes to block 580 where bypass of storage of this cache line in the LLC may occur. That is, in some cases, instead of being maintained for any amount of time in the LLC, a low priority cache line may simply be cast out to system memory without storage in the LLC, to improve hit rates for more useful data, e.g., demand-based requests. Understand while shown at this high level in the embodiment of FIG. 5, many variations and alternatives are possible.

Figure 6:
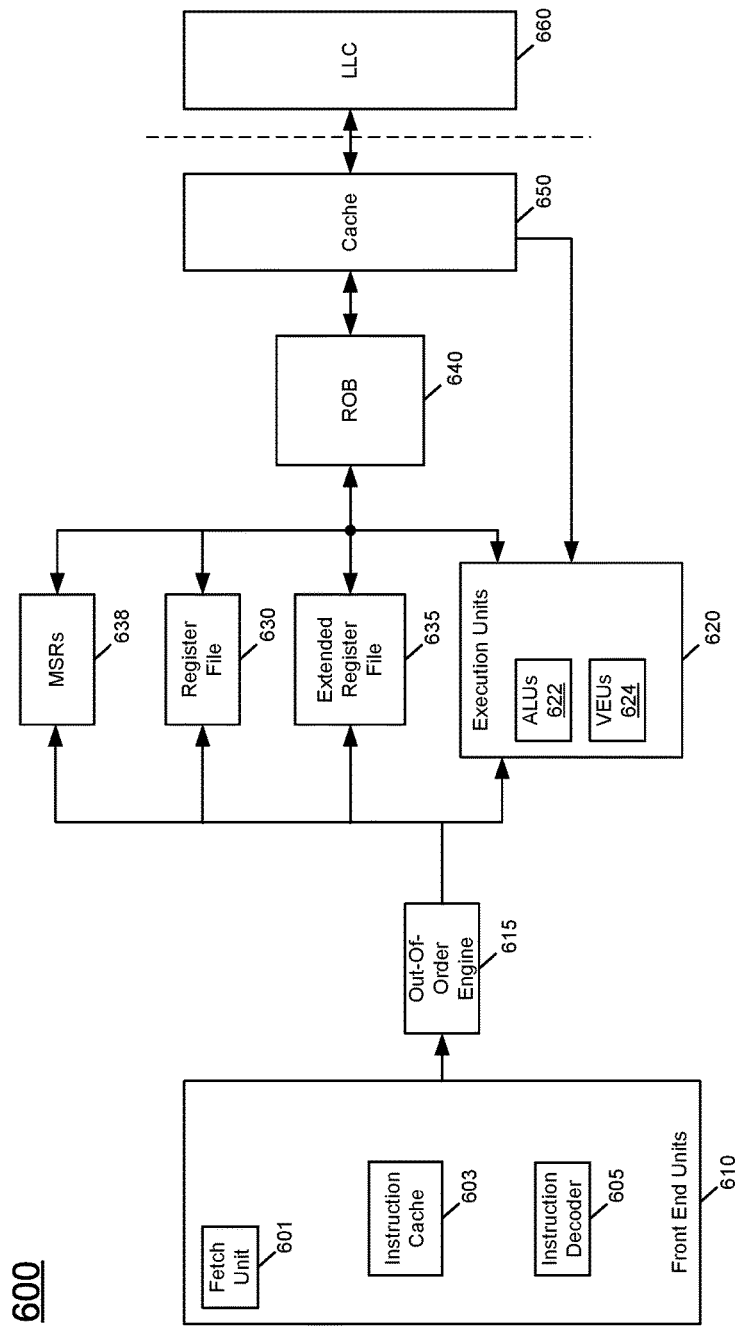
FIG. 6 is a block diagram of a micro-architecture of a processor core in accordance with one embodiment of the present invention.

Referring now to FIG. 6, shown is a block diagram of a micro-architecture of a processor core in accordance with one embodiment of the present invention. As shown in FIG. 6, processor core 600 may be a multi-stage pipelined out-of-order processor. As seen in FIG. 6, core 600 includes front end units 610, which may be used to fetch instructions to be executed and prepare them for use later in the processor pipeline. For example, front end units 610 may include a fetch unit 601, an instruction cache 603, and an instruction decoder 605. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635. Register file 630 may include separate register files for integer and floating point operations. For purposes of configuration, control, and additional operations, a set of machine specific registers (MSRs) 638 may also be present and accessible to various logic within core 600 (and external to the core).

Various resources may be present in execution units 620, including, for example, various integer, floating point, and single instruction multiple data (SIMD) logic units, among other specialized hardware. For example, such execution units may include one or more arithmetic logic units (ALUs) 622 and one or more vector execution units 624, among other such execution units.

Results from the execution units may be provided to retirement logic, namely a reorder buffer (ROB) 640. More specifically, ROB 640 may include various arrays and logic to receive information associated with instructions that are executed. This information is then examined by ROB 640 to determine whether the instructions can be validly retired and result data committed to the architectural state of the processor, or whether one or more exceptions occurred that prevent a proper retirement of the instructions. Of course, ROB 640 may handle other operations associated with retirement.

As shown in FIG. 6, ROB 640 is coupled to a cache 650 which, in one embodiment may be a low level cache (e.g., an L1 cache) although the scope of the present invention is not limited in this regard. Also, execution units 620 can be directly coupled to cache 650. From cache 650, data communication may occur with higher level caches, system memory and so forth. As discussed herein, cache 650 may be in communication with higher level caches including one or more of an L2 and LLC. In embodiments herein, independent learning mechanisms for prefetchable and non-prefetchable (namely demand-based) requests can be provided to improve maintenance of demand-based data within a cache memory hierarchy. Thus as illustrated in FIG. 6, a higher level cache 660 (external to core 600) couples to cache 650. While shown with this high level in the embodiment of FIG. 6, understand the scope of the present invention is not limited in this regard. For example, while the implementation of FIG. 6 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 7:
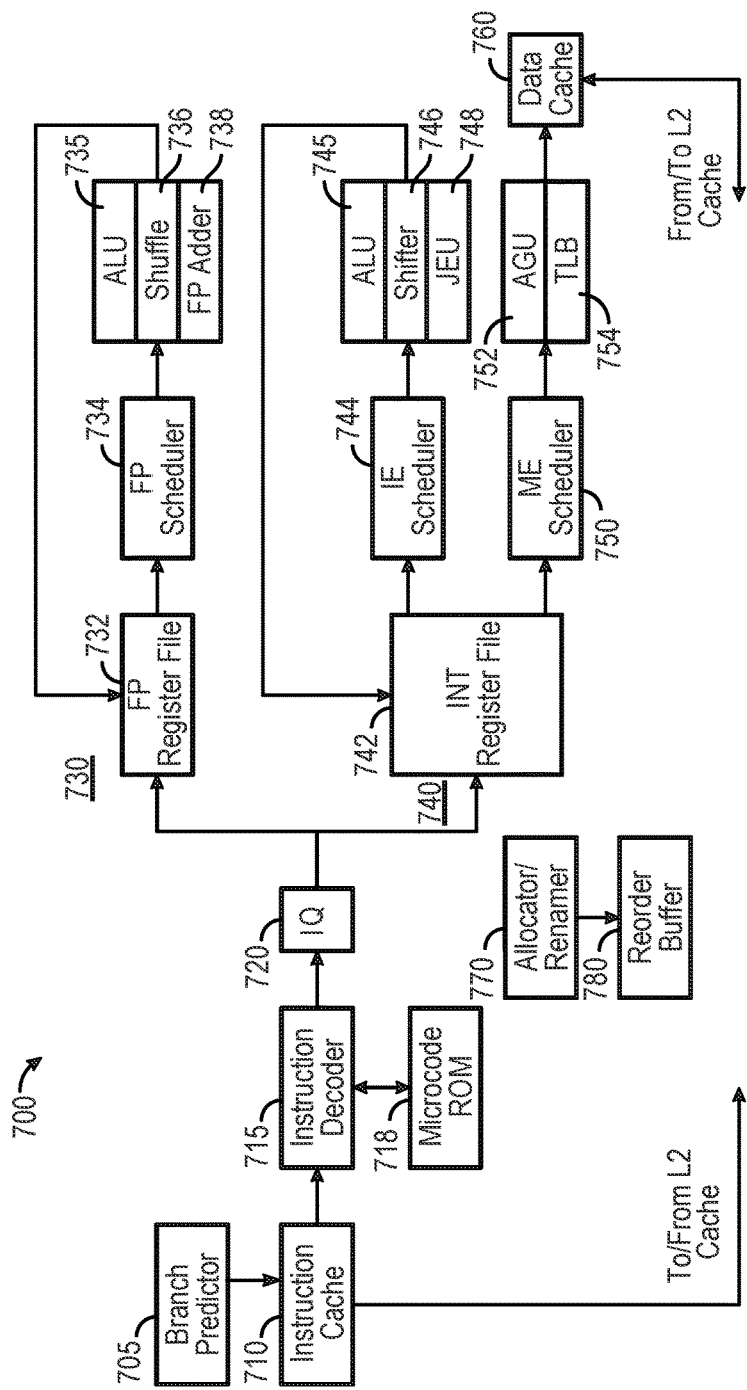
FIG. 7 is a block diagram of a micro-architecture of a processor core in accordance with another embodiment.

Referring now to FIG. 7, shown is a block diagram of a micro-architecture of a processor core in accordance with another embodiment. In the embodiment of FIG. 7, core 700 may be a low power core of a different micro-architecture, such as an Intel® Atom™-based processor having a relatively limited pipeline depth designed to reduce power consumption. As seen, core 700 includes an instruction cache 710 coupled to provide instructions to an instruction decoder 715. A branch predictor 705 may be coupled to instruction cache 710. Note that instruction cache 710 may further be coupled to another level of a cache memory, such as an L2 cache (not shown for ease of illustration in FIG. 7). In turn, instruction decoder 715 provides decoded instructions to an issue queue (IQ) 720 for storage and delivery to a given execution pipeline. A microcode ROM 718 is coupled to instruction decoder 715.

A floating point pipeline 730 includes a floating point (FP) register file 732 which may include a plurality of architectural registers of a given bit width such as 128, 256 or 512 bits. Pipeline 730 includes a floating point scheduler 734 to schedule instructions for execution on one of multiple execution units of the pipeline. In the embodiment shown, such execution units include an ALU 735, a shuffle unit 736, and a floating point adder 738. In turn, results generated in these execution units may be provided back to buffers and/or registers of register file 732. Of course understand while shown with these few example execution units, additional or different floating point execution units may be present in another embodiment.

An integer pipeline 740 also may be provided. In the embodiment shown, pipeline 740 includes an integer (INT) register file 742 which may include a plurality of architectural registers of a given bit width such as 128 or 256 bits. Pipeline 740 includes an integer execution (IE) scheduler 744 to schedule instructions for execution on one of multiple execution units of the pipeline. In the embodiment shown, such execution units include an ALU 745, a shifter unit 746, and a jump execution unit (JEU) 748. In turn, results generated in these execution units may be provided back to buffers and/or registers of register file 742. Of course understand while shown with these few example execution units, additional or different integer execution units may be present in another embodiment.

A memory execution (ME) scheduler 750 may schedule memory operations for execution in an address generation unit (AGU) 752, which is also coupled to a TLB 754. As seen, these structures may couple to a data cache 760, which may be a L0 and/or L1 data cache that in turn couples to additional levels of a cache memory hierarchy, including an L2 cache memory and which may be part of a cache memory hierarchy providing a prefetch-aware replacement policy as described herein.

To provide support for out-of-order execution, an allocator/renamer 770 may be provided, in addition to a reorder buffer 780, which is configured to reorder instructions executed out of order for retirement in order. Although shown with this particular pipeline architecture in the illustration of FIG. 7, understand that many variations and alternatives are possible.

Figure 8:
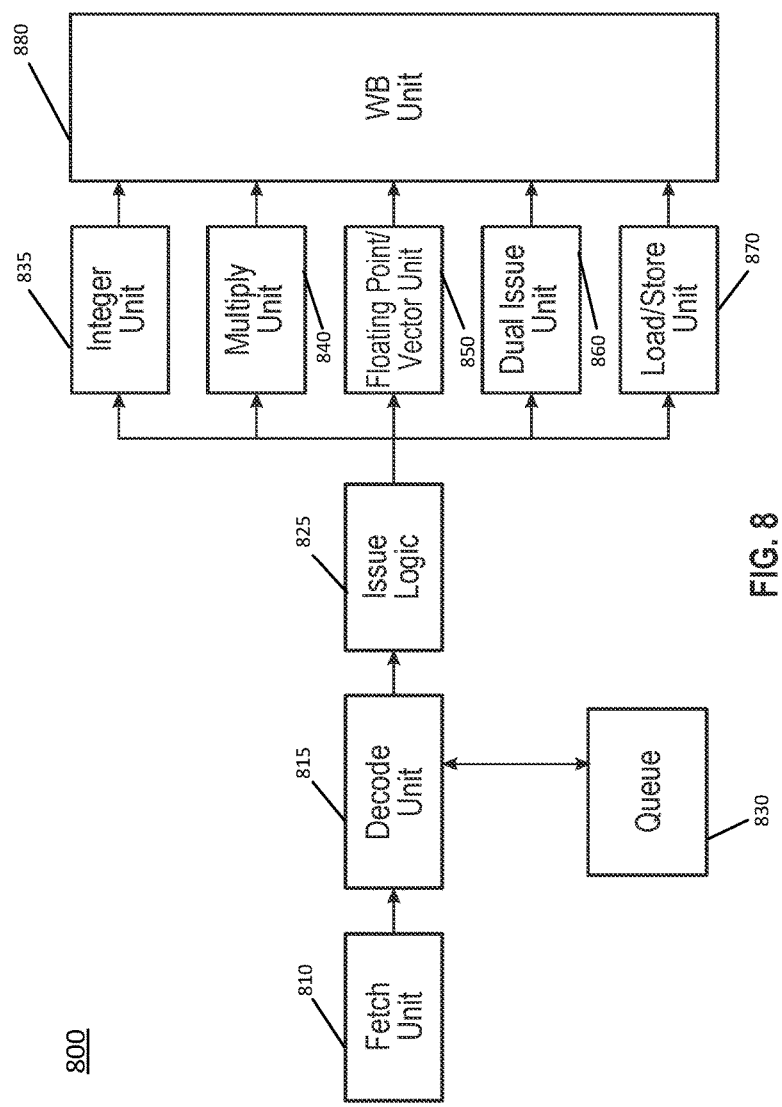
FIG. 8 is a block diagram of a micro-architecture of a processor core in accordance with yet another embodiment.

Referring to FIG. 8, shown is a block diagram of a micro-architecture of a processor core in accordance with yet another embodiment. As illustrated in FIG. 8, a core 800 may include a multi-staged in-order pipeline to execute at very low power consumption levels. As one such example, processor 800 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 800 includes a fetch unit 810 that is configured to fetch instructions and provide them to a decode unit 815, which may decode the instructions, e.g., macro-instructions of a given ISA such as an ARMv8 ISA. Note further that a queue 830 may couple to decode unit 815 to store decoded instructions. Decoded instructions are provided to an issue logic 825, where the decoded instructions may be issued to a given one of multiple execution units.

With further reference to FIG. 8, issue logic 825 may issue instructions to one of multiple execution units. In the embodiment shown, these execution units include an integer unit 835, a multiply unit 840, a floating point/vector unit 850, a dual issue unit 860, and a load/store unit 870. The results of these different execution units may be provided to a writeback (WB) unit 880. Understand that while a single writeback unit is shown for ease of illustration, in some implementations separate writeback units may be associated with each of the execution units. Furthermore, understand that while each of the units and logic shown in FIG. 8 is represented at a high level, a particular implementation may include more or different structures. A processor designed using one or more cores having a pipeline as in FIG. 8 may be implemented in many different end products, extending from mobile devices to server systems.

Figure 9:
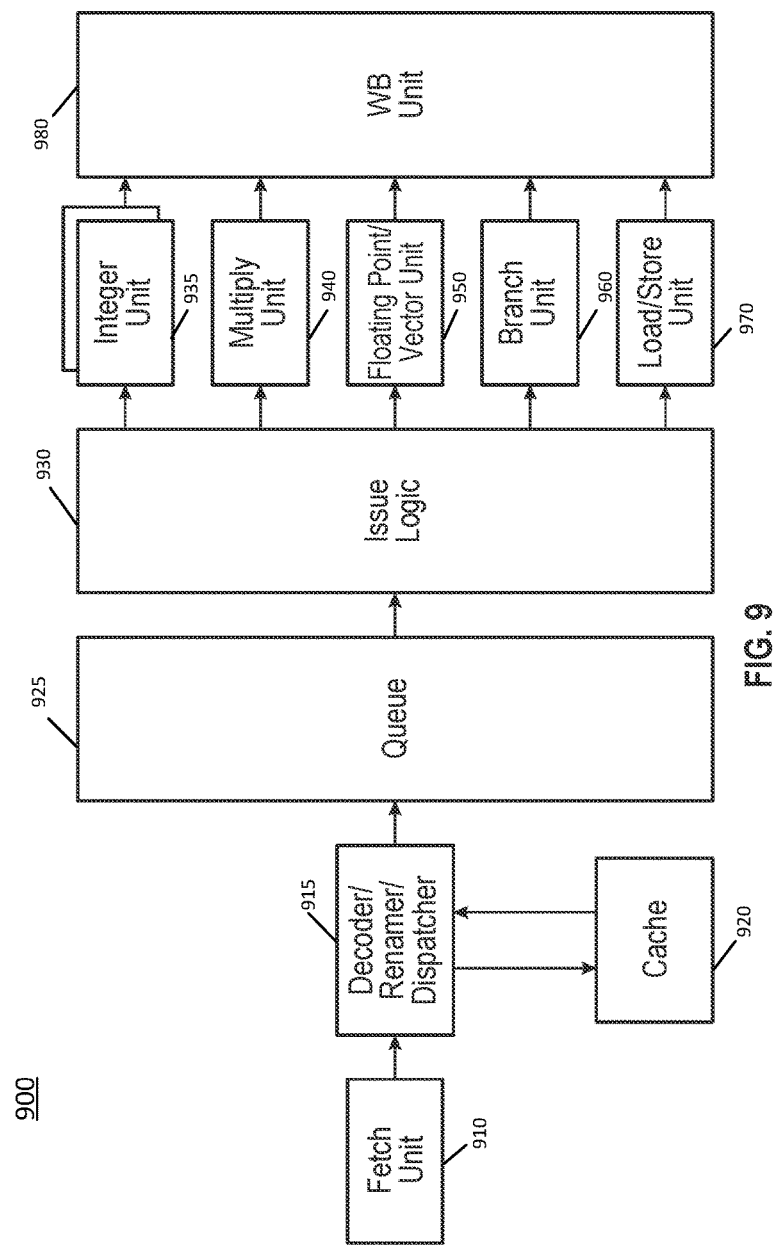
FIG. 9 is a block diagram of a micro-architecture of a processor core in accordance with a still further embodiment.

Referring to FIG. 9, shown is a block diagram of a micro-architecture of a processor core in accordance with a still further embodiment. As illustrated in FIG. 9, a core 900 may include a multi-stage multi-issue out-of-order pipeline to execute at very high performance levels (which may occur at higher power consumption levels than core 800 of FIG. 8). As one such example, processor 900 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 900 includes a fetch unit 910 that is configured to fetch instructions and provide them to a decoder/renamer/dispatcher unit 915 coupled to a cache 920. Unit 915 may decode the instructions, e.g., macro-instructions of an ARMv8 instruction set architecture, rename register references within the instructions, and dispatch the instructions (eventually) to a selected execution unit. Decoded instructions may be stored in a queue 925. Note that while a single queue structure is shown for ease of illustration in FIG. 9, understand that separate queues may be provided for each of the multiple different types of execution units.

Also shown in FIG. 9 is an issue logic 930 from which decoded instructions stored in queue 925 may be issued to a selected execution unit. Issue logic 930 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 935, a multiply unit 940, a floating point/vector unit 950, a branch unit 960, and a load/store unit 970. In an embodiment, floating point/vector unit 950 may be configured to handle SIMD or vector data of 128 or 256 bits. Still further, floating point/vector execution unit 950 may perform IEEE-754 double precision floating-point operations. The results of these different execution units may be provided to a writeback unit 980. Note that in some implementations separate writeback units may be associated with each of the execution units. Furthermore, understand that while each of the units and logic shown in FIG. 9 is represented at a high level, a particular implementation may include more or different structures.

Figure 10:
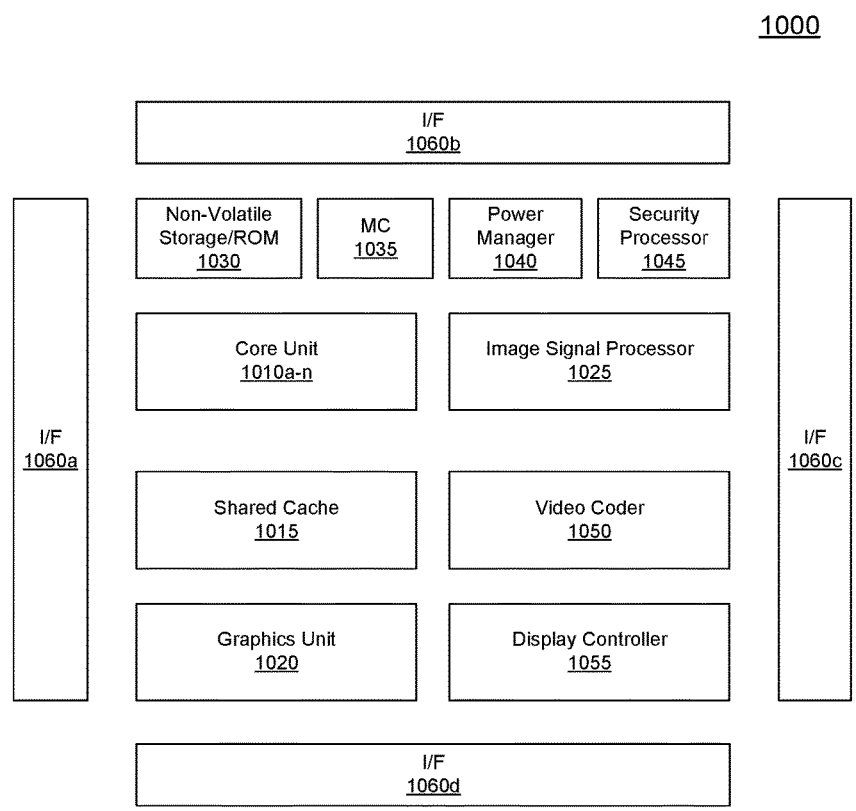
FIG. 10 is a block diagram of a processor in accordance with another embodiment of the present invention.

A processor designed using one or more cores having pipelines as in any one or more of FIGS. 6-9 may be implemented in many different end products, extending from mobile devices to server systems. Referring now to FIG. 10, shown is a block diagram of a processor in accordance with another embodiment of the present invention. In the embodiment of FIG. 10, processor 1000 may be a SoC including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, which may incorporate a heterogeneous system architecture having a heterogeneous system architecture-based processor design.

In the high level view shown in FIG. 10, processor 1000 includes a plurality of core units 1010a-1010n. Each core unit may include one or more processor cores, one or more cache memories and other circuitry. Each core unit 1010 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a shared cache memory 1015 which in an embodiment may be a shared last level cache memory and which may be part of a cache memory hierarchy providing a prefetch-aware replacement policy as described herein. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a DRAM (not shown for ease of illustration in FIG. 10).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip.

Other accelerators also may be present. In the illustration of FIG. 10, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth. Each of the units may have its power consumption controlled via a power manager 1040.

In some embodiments, SoC 1000 may further include a non-coherent fabric coupled to the coherent fabric to which various peripheral devices may couple. One or more interfaces 1060a-1060d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 10, understand the scope of the present invention is not limited in this regard.

Figure 11:
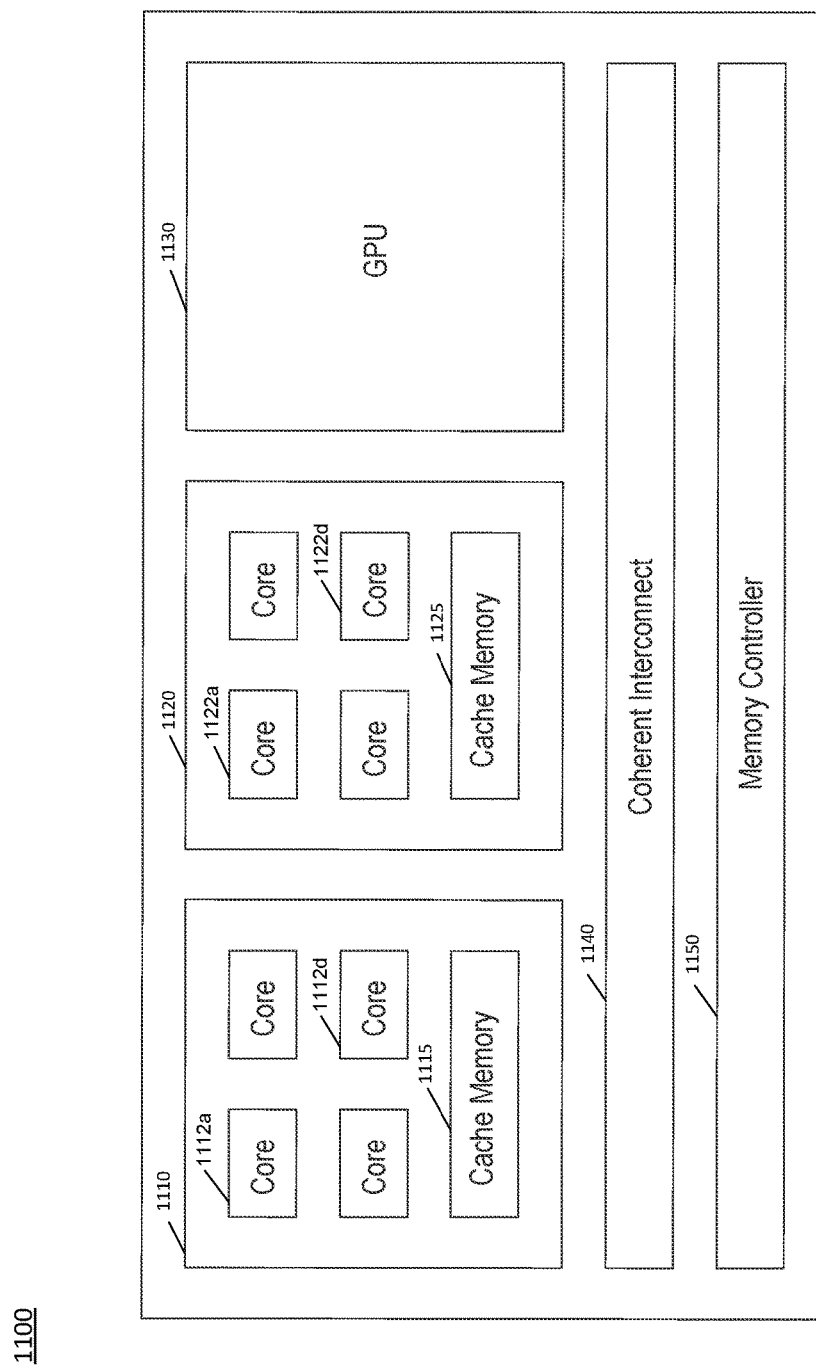
FIG. 11 is a block diagram of a representative SoC in accordance with an embodiment of the present invention.

Referring now to FIG. 11, shown is a block diagram of a representative SoC. In the embodiment shown, SoC 1100 may be a multi-core SoC configured for low power operation to be optimized for incorporation into a smartphone or other low power device such as a tablet computer or other portable computing device. As an example, SoC 1100 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 11, SoC 1100 includes a first core domain 1110 having a plurality of first cores 1112a-1112d. In an example, these cores may be low power cores such as in-order cores. In one embodiment these first cores may be implemented as ARM Cortex A53 cores. In turn, these cores couple to a cache memory 1115 of core domain 1110. In addition, SoC 1100 includes a second core domain 1120. In the illustration of FIG. 11, second core domain 1120 has a plurality of second cores 1122a-1122d. In an example, these cores may be higher power-consuming cores than first cores 1112. In an embodiment, the second cores may be out-of-order cores, which may be implemented as ARM Cortex A57 cores. In turn, these cores couple to a cache memory 1125 of core domain 1120. Note that while the example shown in FIG. 11 includes 4 cores in each domain, understand that more or fewer cores may be present in a given domain in other examples. Cache memories 1115, 1125 may execute prefetch-aware replacement policies to better maintain demand-based data in a cache memory hierarchy, as described herein.

With further reference to FIG. 11, a graphics domain 1130 also is provided, which may include one or more graphics processing units (GPUs) configured to independently execute graphics workloads, e.g., provided by one or more cores of core domains 1110 and 1120. As an example, GPU domain 1130 may be used to provide display support for a variety of screen sizes, in addition to providing graphics and display rendering operations.

As seen, the various domains couple to a coherent interconnect 1140, which in an embodiment may be a cache coherent interconnect fabric that in turn couples to an integrated memory controller 1150. Coherent interconnect 1140 may include a shared cache memory, such as an L3 cache, in some examples. In an embodiment, memory controller 1150 may be a direct memory controller to provide for multiple channels of communication with an off-chip memory, such as multiple channels of a DRAM (not shown for ease of illustration in FIG. 11).

Figure 12:
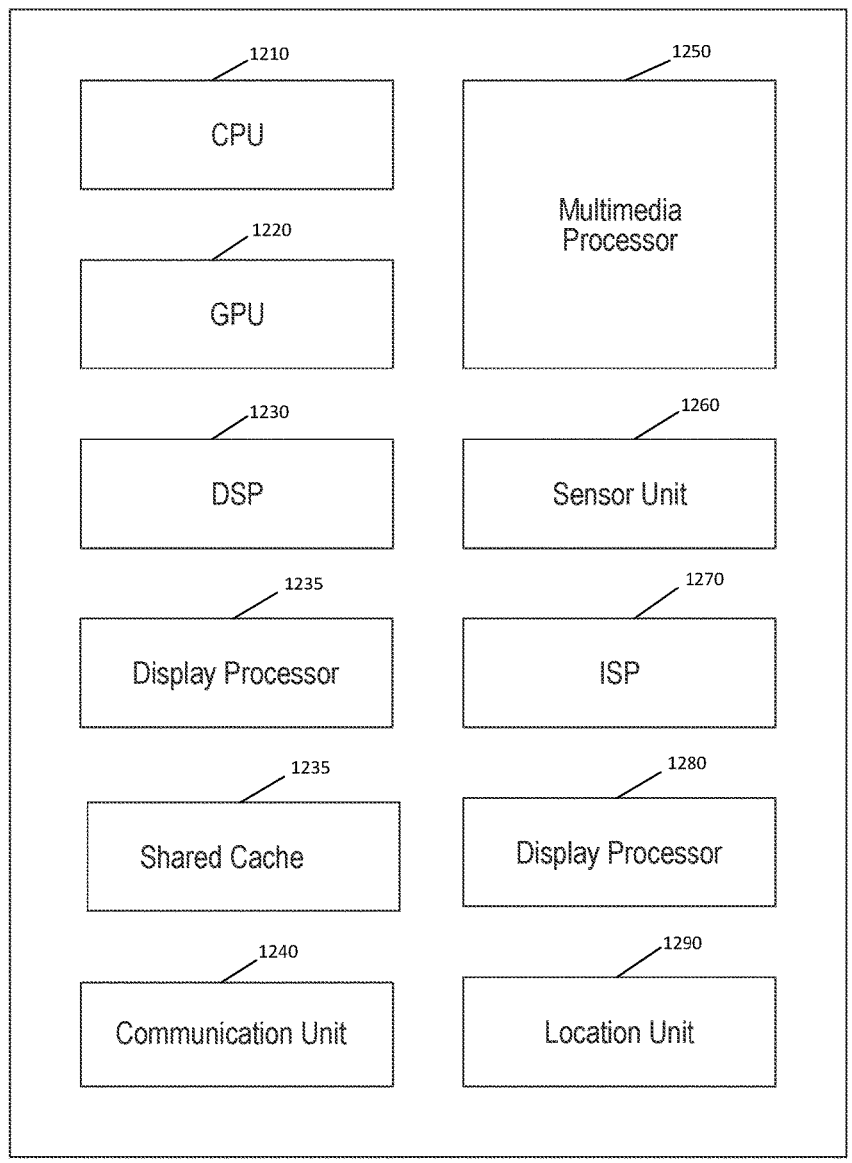
FIG. 12 is a block diagram of another example SoC in accordance with an embodiment of the present invention.

Referring now to FIG. 12, shown is a block diagram of another example SoC. In the embodiment of FIG. 12, SoC 1200 may include various circuitry to enable high performance for multimedia applications, communications and other functions. As such, SoC 1200 is suitable for incorporation into a wide variety of portable and other devices, such as smartphones, tablet computers, smart TVs and so forth. In the example shown, SoC 1200 includes a central processor unit (CPU) domain 1210. In an embodiment, a plurality of individual processor cores may be present in CPU domain 1210. As one example, CPU domain 1210 may be a quad core processor having 4 multithreaded cores. Such processors may be homogeneous or heterogeneous processors, e.g., a mix of low power and high power processor cores.

In turn, a GPU domain 1220 is provided to perform advanced graphics processing in one or more GPUs to handle graphics and compute APIs. A DSP unit 1230 may provide one or more low power DSPs for handling low-power multimedia applications such as music playback, audio/video and so forth, in addition to advanced calculations that may occur during execution of multimedia instructions.

As further illustrated, a shared cache 1245 may couple to ease various domains and may act as an LLC. In embodiments, shared cache 1235 may be configured to perform prefetch-aware replacement techniques to better maintain demand-based data over prefetchable data. In turn, a communication unit 1240 may include various components to provide connectivity via various wireless protocols, such as cellular communications (including 3G/4G LTE), wireless local area protocols such as Bluetooth™, IEEE 802.11, and so forth.

Still further, a multimedia processor 1250 may be used to perform capture and playback of high definition video and audio content, including processing of user gestures. A sensor unit 1260 may include a plurality of sensors and/or a sensor controller to interface to various off-chip sensors present in a given platform. An image signal processor 1270 may be provided with one or more separate ISPs to perform image processing with regard to captured content from one or more cameras of a platform, including still and video cameras.

A display processor 1280 may provide support for connection to a high definition display of a given pixel density, including the ability to wirelessly communicate content for playback on such display. Still further, a location unit 1290 may include a GPS receiver with support for multiple GPS constellations to provide applications highly accurate positioning information obtained using as such GPS receiver. Understand that while shown with this particular set of components in the example of FIG. 12, many variations and alternatives are possible.

Figure 13:
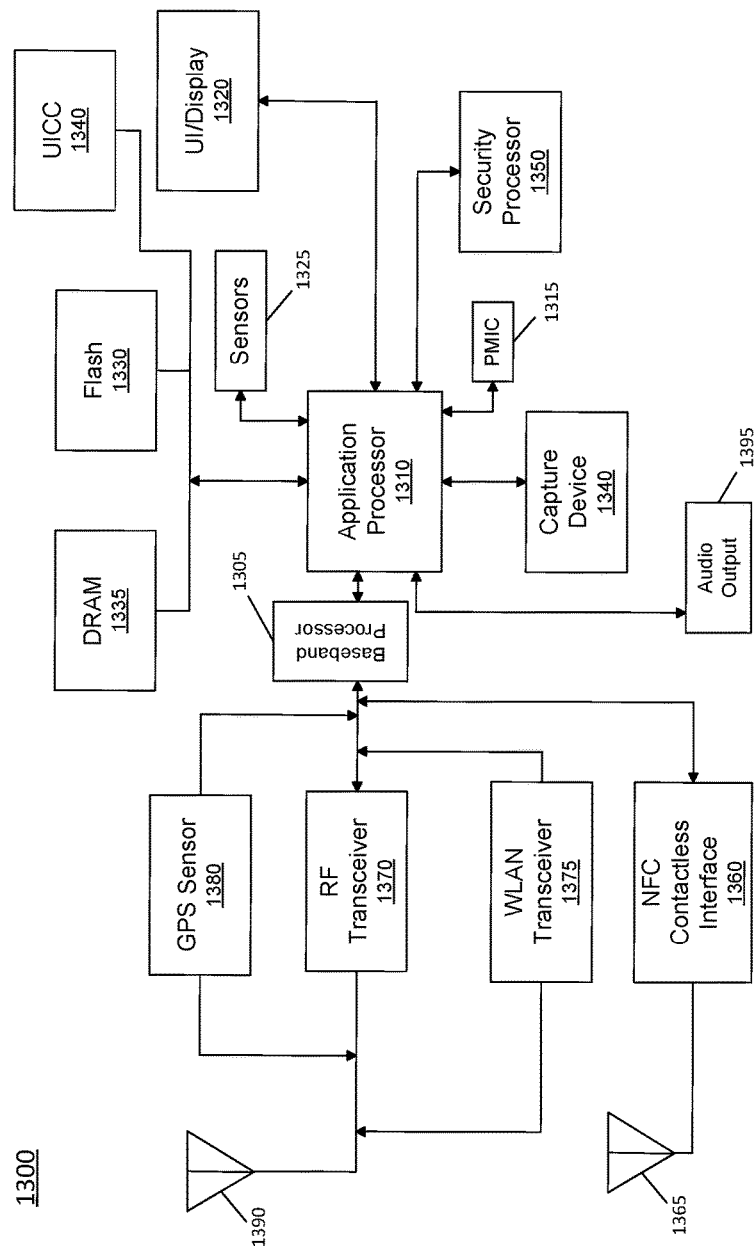
FIG. 13 is a block diagram of an example system in accordance with an embodiment of the present invention.

Referring now to FIG. 13, shown is a block diagram of an example system with which embodiments can be used. As seen, system 1300 may be a smartphone or other wireless communicator. A baseband processor 1305 is configured to perform various signal processing with regard to communication signals to be transmitted from or received by the system. In turn, baseband processor 1305 is coupled to an application processor 1310, which may be a main CPU of the system to execute an OS and other system software, in addition to user applications such as many well-known social media and multimedia apps. Application processor 1310 may further be configured to perform a variety of other computing operations for the device, and may include a cache memory hierarchy as described herein.

In turn, application processor 1310 can couple to a user interface/display 1320, e.g., a touch screen display. In addition, application processor 1310 may couple to a memory system including a non-volatile memory, namely a flash memory 1330 and a system memory, namely a dynamic random access memory (DRAM) 1335. As further seen, application processor 1310 further couples to a capture device 1340 such as one or more image capture devices that can record video and/or still images.

Still referring to FIG. 13, a universal integrated circuit card (UICC) 1340 comprising a subscriber identity module and possibly a secure storage and cryptoprocessor is also coupled to application processor 1310. System 1300 may further include a security processor 1350 that may couple to application processor 1310. A plurality of sensors 1325 may couple to application processor 1310 to enable input of a variety of sensed information such as accelerometer and other environmental information. An audio output device 1395 may provide an interface to output sound, e.g., in the form of voice communications, played or streaming audio data and so forth.

As further illustrated, a near field communication (NFC) contactless interface 1360 is provided that communicates in a NFC near field via an NFC antenna 1365. While separate antennae are shown in FIG. 13, understand that in some implementations one antenna or a different set of antennae may be provided to enable various wireless functionality.

A power management integrated circuit (PMIC) 1315 couples to application processor 1310 to perform platform level power management. To this end, PMIC 1315 may issue power management requests to application processor 1310 to enter certain low power states as desired. Furthermore, based on platform constraints, PMIC 1315 may also control the power level of other components of system 1300.

To enable communications to be transmitted and received, various circuitry may be coupled between baseband processor 1305 and an antenna 1390. Specifically, a radio frequency (RF) transceiver 1370 and a wireless local area network (WLAN) transceiver 1375 may be present. In general, RF transceiver 1370 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1380 may be present. Other wireless communications such as receipt or transmission of radio signals, e.g., AM/FM and other signals may also be provided. In addition, via WLAN transceiver 1375, local wireless communications can also be realized.

Figure 14:
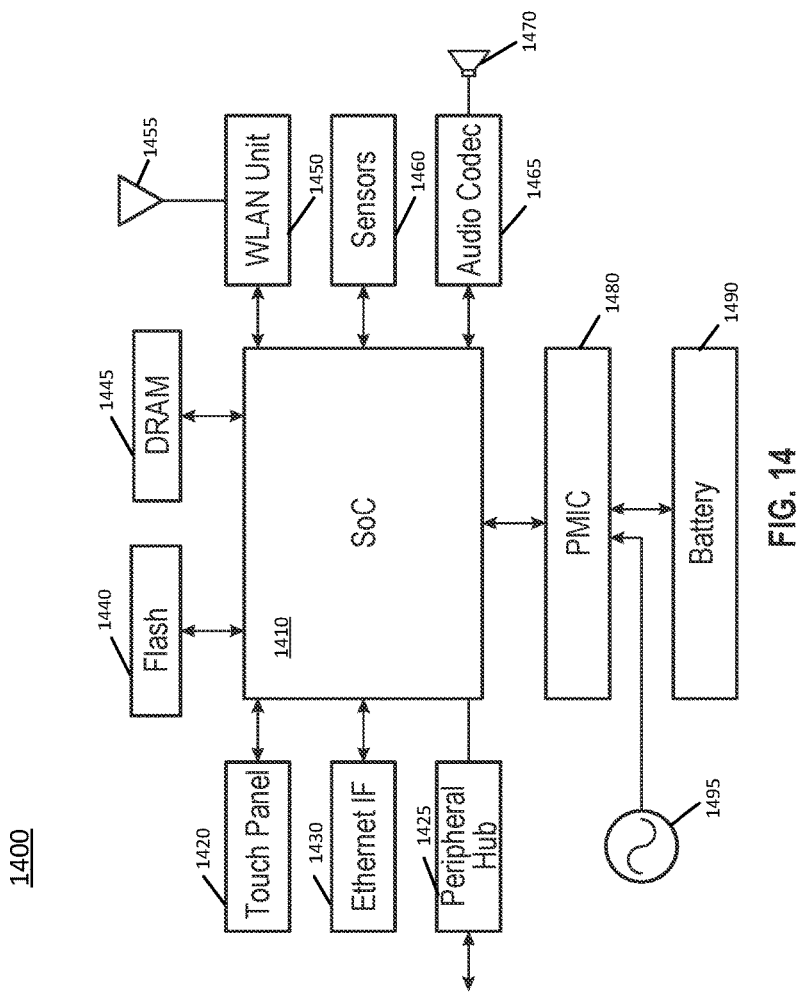
FIG. 14 is a block diagram of another example system in accordance with an embodiment of the present invention.

Referring now to FIG. 14, shown is a block diagram of another example system with which embodiments may be used. In the illustration of FIG. 14, system 1400 may be mobile low-power system such as a tablet computer, 2:1 tablet, phablet or other convertible or standalone tablet system. As illustrated, a SoC 1410 is present and may be configured to operate as an application processor for the device, and may include a cache memory hierarchy as described herein.

A variety of devices may couple to SoC 1410. In the illustration shown, a memory subsystem includes a flash memory 1440 and a DRAM 1445 coupled to SoC 1410. In addition, a touch panel 1420 is coupled to the SoC 1410 to provide display capability and user input via touch, including provision of a virtual keyboard on a display of touch panel 1420. To provide wired network connectivity, SoC 1410 couples to an Ethernet interface 1430. A peripheral hub 1425 is coupled to SoC 1410 to enable interfacing with various peripheral devices, such as may be coupled to system 1400 by any of various ports or other connectors.

In addition to internal power management circuitry and functionality within SoC 1410, a PMIC 1480 is coupled to SoC 1410 to provide platform-based power management, e.g., based on whether the system is powered by a battery 1490 or AC power via an AC adapter 1495. In addition to this power source-based power management, PMIC 1480 may further perform platform power management activities based on environmental and usage conditions. Still further, PMIC 1480 may communicate control and status information to SoC 1410 to cause various power management actions within SoC 1410.

Still referring to FIG. 14, to provide for wireless capabilities, a WLAN unit 1450 is coupled to SoC 1410 and in turn to an antenna 1455. In various implementations, WLAN unit 1450 may provide for communication according to one or more wireless protocols.

As further illustrated, a plurality of sensors 1460 may couple to SoC 1410. These sensors may include various accelerometer, environmental and other sensors, including user gesture sensors. Finally, an audio codec 1465 is coupled to SoC 1410 to provide an interface to an audio output device 1470. Of course understand that while shown with this particular implementation in FIG. 14, many variations and alternatives are possible.

Figure 15:
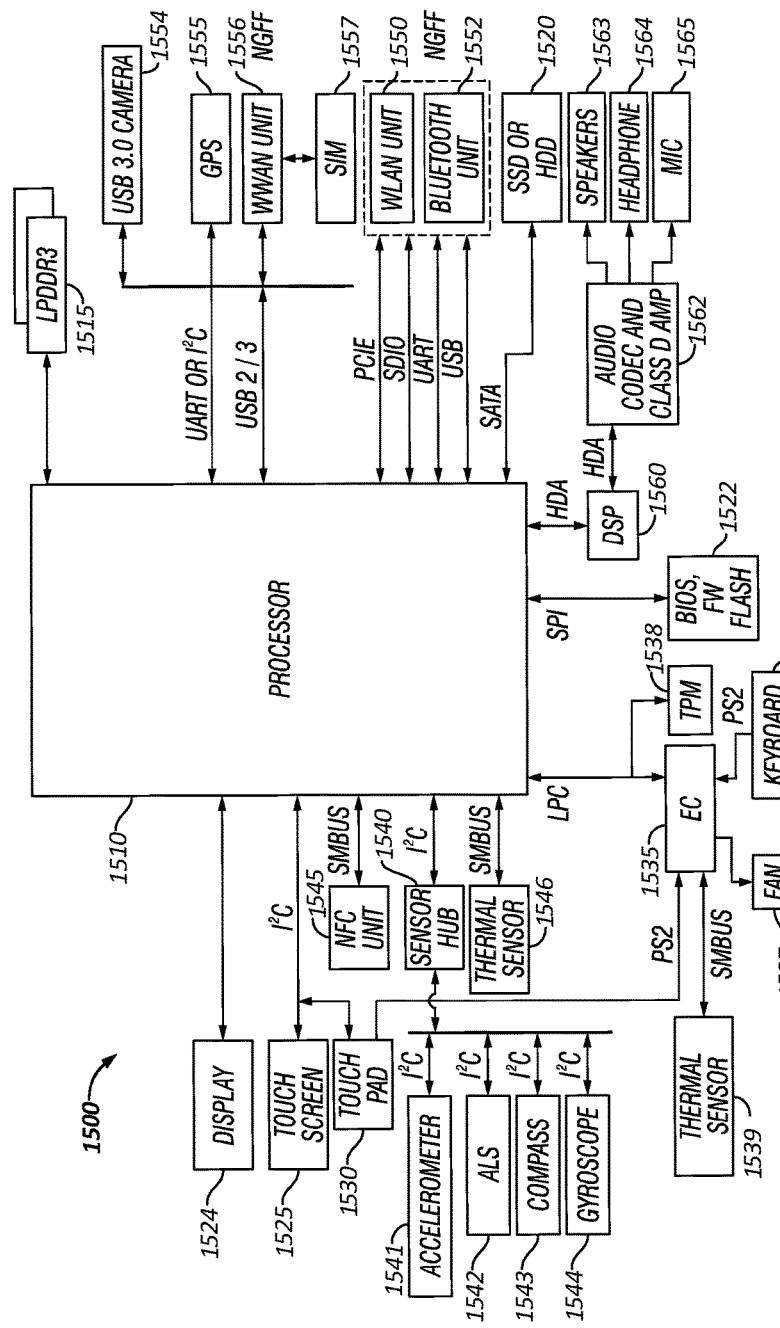
FIG. 15 is a block diagram of a representative computer system in accordance with an embodiment of the present invention.

Referring now to FIG. 15, shown is a block diagram of a representative computer system such as notebook, Ultrabook™ or other small form factor system. A processor 1510, in one embodiment, includes a microprocessor, multi-core processor, multithreaded processor, an ultra low voltage processor, an embedded processor, or other known processing element. In the illustrated implementation, processor 1510 acts as a main processing unit and central hub for communication with many of the various components of the system 1500, and may include a cache memory hierarchy as described herein. As one example, processor 1510 is implemented as a SoC.

Processor 1510, in one embodiment, communicates with a system memory 1515. As an illustrative example, the system memory 1515 is implemented via multiple memory devices or modules to provide for a given amount of system memory.

To provide for persistent storage of information such as data, applications, one or more operating systems and so forth, a mass storage 1520 may also couple to processor 1510. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 15, a flash device 1522 may be coupled to processor 1510, e.g., via a serial peripheral interface (SPI). This flash device may provide for non-volatile storage of system software, including a basic input/output software (BIOS) as well as other firmware of the system.

Various input/output (I/O) devices may be present within system 1500. Specifically shown in the embodiment of FIG. 15 is a display 1524 which may be a high definition LCD or LED panel that further provides for a touch screen 1525. In one embodiment, display 1524 may be coupled to processor 1510 via a display interconnect that can be implemented as a high performance graphics interconnect. Touch screen 1525 may be coupled to processor 1510 via another interconnect, which in an embodiment can be an I²C interconnect. As further shown in FIG. 15, in addition to touch screen 1525, user input by way of touch can also occur via a touch pad 1530 which may be configured within the chassis and may also be coupled to the same I²C interconnect as touch screen 1525.

For perceptual computing and other purposes, various sensors may be present within the system and may be coupled to processor 1510 in different manners. Certain inertial and environmental sensors may couple to processor 1510 through a sensor hub 1540, e.g., via an I²C interconnect. In the embodiment shown in FIG. 15, these sensors may include an accelerometer 1541, an ambient light sensor (ALS) 1542, a compass 1543 and a gyroscope 1544. Other environmental sensors may include one or more thermal sensors 1546 which in some embodiments couple to processor 1510 via a system management bus (SMBus) bus.

Also seen in FIG. 15, various peripheral devices may couple to processor 1510 via a low pin count (LPC) interconnect. In the embodiment shown, various components can be coupled through an embedded controller 1535. Such components can include a keyboard 1536 (e.g., coupled via a PS2 interface), a fan 1537, and a thermal sensor 1539. In some embodiments, touch pad 1530 may also couple to EC 1535 via a PS2 interface. In addition, a security processor such as a trusted platform module (TPM) 1538 may also couple to processor 1510 via this LPC interconnect.

System 1500 can communicate with external devices in a variety of manners, including wirelessly. In the embodiment shown in FIG. 15, various wireless modules, each of which can correspond to a radio configured for a particular wireless communication protocol, are present. One manner for wireless communication in a short range such as a near field may be via a NFC unit 1545 which may communicate, in one embodiment with processor 1510 via an SMBus. Note that via this NFC unit 1545, devices in close proximity to each other can communicate.

As further seen in FIG. 15, additional wireless units can include other short range wireless engines including a WLAN unit 1550 and a Bluetooth™ unit 1552. Using WLAN unit 1550, Wi-Fi™ communications can be realized, while via Bluetooth™ unit 1552, short range Bluetooth™ communications can occur. These units may communicate with processor 1510 via a given link.

In addition, wireless wide area communications, e.g., according to a cellular or other wireless wide area protocol, can occur via a WWAN unit 1556 which in turn may couple to a subscriber identity module (SIM) 1557. In addition, to enable receipt and use of location information, a GPS module 1555 may also be present. Note that in the embodiment shown in FIG. 15, WWAN unit 1556 and an integrated capture device such as a camera module 1554 may communicate via a given link.

To provide for audio inputs and outputs, an audio processor can be implemented via a digital signal processor (DSP) 1560, which may couple to processor 1510 via a high definition audio (HDA) link. Similarly, DSP 1560 may communicate with an integrated coder/decoder (CODEC) and amplifier 1562 that in turn may couple to output speakers 1563 which may be implemented within the chassis. Similarly, amplifier and CODEC 1562 can be coupled to receive audio inputs from a microphone 1565 which in an embodiment can be implemented via dual array microphones (such as a digital microphone array) to provide for high quality audio inputs to enable voice-activated control of various operations within the system. Note also that audio outputs can be provided from amplifier/CODEC 1562 to a headphone jack 1564. Although shown with these particular components in the embodiment of FIG. 15, understand the scope of the present invention is not limited in this regard.

Figure 16:
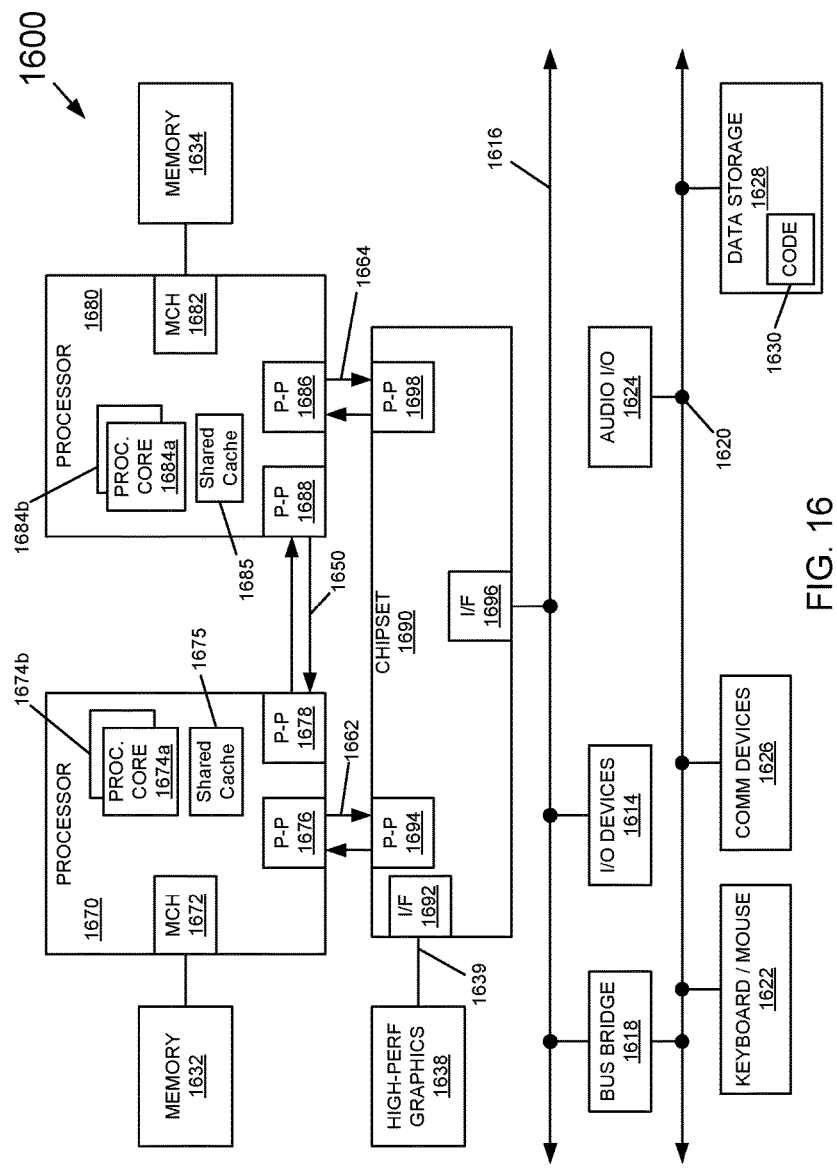
FIG. 16 is a block diagram of a system in accordance with an embodiment of the present invention.

Embodiments may be implemented in many different system types. Referring now to FIG. 16, shown is a block diagram of a system in accordance with an embodiment of the present invention. As shown in FIG. 16, multiprocessor system 1600 is a point-to-point interconnect system, and includes a first processor 1670 and a second processor 1680 coupled via a point-to-point interconnect 1650. As shown in FIG. 16, each of processors 1670 and 1680 may be multicore processors, including first and second processor cores (i.e., processor cores 1674*a* and 1674*b* and processor cores 1684*a* and 1684*b*), although potentially many more cores may be present in the processors. Each of the processors includes a shared cache memory 1675, 1685 to perform prefetch-aware replacement activities, to better maintain demand-based data within a cache memory hierarchy, as described herein.

Still referring to FIG. 16, first processor 1670 further includes a memory controller hub (MCH) 1672 and point-to-point (P-P) interfaces 1676 and 1678. Similarly, second processor 1680 includes a MCH 1682 and P-P interfaces 1686 and 1688. As shown in FIG. 16, MCH's 1672 and 1682 couple the processors to respective memories, namely a memory 1632 and a memory 1634, which may be portions of system memory (e.g., DRAM) locally attached to the respective processors. First processor 1670 and second processor 1680 may be coupled to a chipset 1690 via P-P interconnects 1662 and 1664, respectively. As shown in FIG. 16, chipset 1690 includes P-P interfaces 1694 and 1698.

Furthermore, chipset 1690 includes an interface 1692 to couple chipset 1690 with a high performance graphics engine 1638, by a P-P interconnect 1639. In turn, chipset 1690 may be coupled to a first bus 1616 via an interface 1696. As shown in FIG. 16, various input/output (I/O) devices 1614 may be coupled to first bus 1616, along with a bus bridge 1618 which couples first bus 1616 to a second bus 1620. Various devices may be coupled to second bus 1620 including, for example, a keyboard/mouse 1622, communication devices 1626 and a data storage unit 1628 such as a disk drive or other mass storage device which may include code 1630, in one embodiment. Further, an audio I/O 1624 may be coupled to second bus 1620. Embodiments can be incorporated into other types of systems including mobile devices such as a smart cellular telephone, tablet computer, netbook, Ultrabook™, or so forth.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 17:
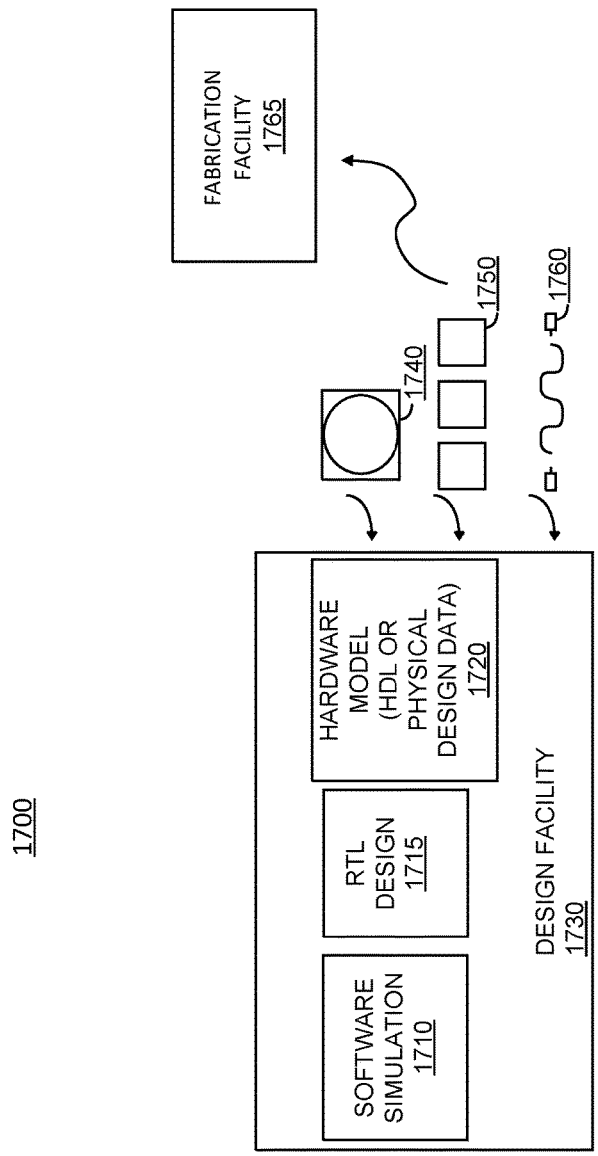
FIG. 17 is a block diagram illustrating an IP core development system in accordance with an embodiment of the present invention.

FIG. 17 is a block diagram illustrating an IP core development system 1700 that may be used to manufacture an integrated circuit to perform operations according to an embodiment. The IP core development system 1700 may be used to generate modular, reusable designs that can be incorporated into a larger design or used to construct an entire integrated circuit (e.g., an SoC integrated circuit). A design facility 1730 can generate a software simulation 1710 of an IP core design in a high level programming language (e.g., C/C++). The software simulation 1710 can be used to design, test, and verify the behavior of the IP core. A register transfer level (RTL) design can then be created or synthesized from the simulation model. The RTL design 1715 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1715 or equivalent may be further synthesized by the design facility into a hardware model 1720, which may be in a hardware description language (HDL), or some other representation of physical design data. The HDL may be further simulated or tested to verify the IP core design. The IP core design can be stored for delivery to a third party fabrication facility 1765 using non-volatile memory 1740 (e.g., hard disk, flash memory, or any non-volatile storage medium). Alternately, the IP core design may be transmitted (e.g., via the Internet) over a wired connection 1750 or wireless connection 1760. The fabrication facility 1765 may then fabricate an integrated circuit that is based at least in part on the IP core design. The fabricated integrated circuit can be configured to perform operations in accordance with at least one embodiment described herein.

The following examples pertain to further embodiments.

In one example, a processor comprises: a first cache memory to store a first plurality of cache lines; a first cache controller to control the first cache memory, the first cache controller including a replacement circuit to: associate a first priority indicator with a first cache line based on storage of demand data in the first cache line and first learning information associated with a set of demand-based categories of cache lines; and associate a second priority indicator with a second cache line based on storage of prefetch data in the second cache line and second learning information associated with a set of prefetch-based categories of cache lines; a second cache memory to store a second plurality of cache lines; and a second cache controller to control the second cache memory, the second cache controller including an eviction circuit to identify at least one of the second plurality of cache lines to evict to accommodate a cache line received from the first cache memory.

In an example, the first cache controller is to evict the first cache line and send the first cache line and the first priority indicator to the second cache controller.

In an example, the first learning information is independent of the second learning information, the set of demand-based categories of cache lines is independent of the set of prefetch-based categories of cache lines, and the first priority indicator is to indicate a higher priority than the second priority indicator.

In an example, the replacement circuit is to associate the first priority indicator with a third cache line that stores prefetch data when the third cache line was filled into the first cache memory from the second cache memory.

In an example, the second cache controller is to prioritize storage of cache lines that store demand data over storage of cache lines that store prefetch data.

In an example, each of the first plurality of cache lines includes a metadata portion to store metadata, the metadata portion including a prefetch field to store an indicator having a first value to indicate that the cache line stores prefetch data.

In an example, the first cache controller is to identify that the second cache line stores prefetch data based on the indicator of the prefetch field of the metadata portion of the first cache line having the first value.

In an example, the first cache controller includes an observer circuit to identify a plurality of observer sets of the first cache memory and to maintain a first counter and a second counter for each of the set of demand-based categories of cache lines and the set of prefetch-based categories of cache lines, the first learning information comprising a value of the first counter and a value of the second counter for the set of demand-based categories of cache lines and the second learning information comprising a value of the first counter and a value of the second counter for the set of prefetch-based categories of cache lines.

In an example, the first cache controller is to associate the first priority indicator with a third line of the first cache memory of a first prefetch-based category of the set of prefetch-based categories of cache lines in response to a comparison result between the value of the first counter and the value of the second counter associated with the first prefetch-based category that exceeds a threshold.

In an example, the first cache controller is to associate the second priority indicator with a fourth line of the first cache memory of a first demand-based category of the set of demand-based categories of cache lines in response to a comparison result between the value of the first counter and the value of the second counter associated with the first demand-based category that is less than the threshold.

In an example, the second cache controller is to bypass storage of the second cache line in the second cache memory based at least in part on the second priority indicator.

In another example, a method comprises: receiving, in a first cache memory of a processor, a cache line from a memory coupled to the processor in response to a memory request for data in the cache line; in response to determining that the memory request was a prefetch request, storing the cache line in the first cache memory and setting a bin identifier for the cache line to a first prefetch value to indicate that the memory request was the prefetch request; in response to determining that the memory request was a demand request, storing the cache line in the first cache memory and setting the bin identifier for the cache line to a first demand value to indicate that the memory request was the demand request; and updating the bin identifier for the cache line in response to the cache line being hit by a demand request while the cache line is stored in the first cache memory.

In an example, updating the bin identifier for the cache line comprises updating the bin identifier for the cache line to a second prefetch value in response to the cache line being hit by a demand request while the cache line is stored in the first cache memory.

In an example, the method further comprises: receiving a second cache line from a second cache memory of the processor coupled to the first cache memory; and setting a bin identifier for the second cache line to a reuse bin value to identify that the second cache line has a highest priority.

In an example, the method further comprises: identifying the cache line for eviction from the first cache memory; accessing, based on a value of the bin identifier for the cache line, a first counter value and a second counter value associated with a bin category; processing the first counter value and the second counter value to generate a processed value; associating a priority value with the cache line based at least in part on the processed value; and sending an eviction notification for the cache line to a second cache memory with the priority value.

In an example, the method further comprises: storing the cache line in the second cache memory with a first age indicator based at least in part on the priority value having a first level; and storing the cache line in the second cache memory with a second age indicator based at least in part on the priority value having a second level, the first age indicator to indicate a higher priority than the second age indicator.

In an example, the method further comprises bypassing storage of the cache line in the second cache memory based at least in part on the priority value.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor and a system memory coupled to the processor. The processor may comprise: a plurality of cores each including a first level cache memory; and a cache memory hierarchy coupled to the plurality of cores. In turn, the cache memory hierarchy may include: the first level cache memory included in the plurality of cores; a second level cache memory coupled to the first level cache memory; and a shared cache memory coupled to the second level cache memory. The shared cache memory may include: a first cache controller to prioritize maintenance in the shared cache memory of demand-based data over prefetch-based data, when the demand-based data has a higher hit rate in the shared cache memory than the prefetch-based data.

In an example, the second level cache memory comprises a second cache controller to: associate a first priority indicator with a first cache line having the demand-based data and first access information associated with a first demand-based usage category; and associate a second priority indicator with a second cache line having the prefetch-based data and second access information associated with a first prefetch-based usage category.

In an example, the first cache controller is to: store in the shared cache memory first prefetch-based data evicted from the second level cache memory based at least in part on reuse of the first prefetch-based data after a prior storage in the shared cache memory; and bypass storage in the shared cache memory of second prefetch-based data evicted from the second level cache memory based at least in part on a priority indicator associated with the second prefetch-based data.

In another example, an apparatus comprises: a first cache memory to store a first plurality of cache lines; a first cache control means for controlling the first cache memory, the first cache control means including a replacement means for associating a first priority indicator with a first cache line based on storage of demand data in the first cache line and first learning information associated with a set of demand-based categories of cache lines; and associating a second priority indicator with a second cache line based on storage of prefetch data in the second cache line and second learning information associated with a set of prefetch-based categories of cache lines; a second cache memory to store a second plurality of cache lines; and a second cache control means for controlling the second cache memory, the second cache control means including an eviction means for identifying at least one of the second plurality of cache lines to evict to accommodate a cache line received from the first cache memory.

In an example, the first cache control means is to evict the first cache line and send the first cache line and the first priority indicator to the second cache control means.

In an example, the first learning information is independent of the second learning information, the set of demand-based categories of cache lines is independent of the set of prefetch-based categories of cache lines, and the first priority indicator is to indicate a higher priority than the second priority indicator.

In an example, the replacement means is to associate the first priority indicator with a third cache line that stores prefetch data when the third cache line was filled into the first cache memory from the second cache memory.

In an example, the first cache control means includes an observer means for identifying a plurality of observer sets of the first cache memory and maintaining a first counter and a second counter for each of the set of demand-based categories of cache lines and the set of prefetch-based categories of cache lines, the first learning information comprising a value of the first counter and a value of the second counter for the set of demand-based categories of cache lines and the second learning information comprising a value of the first counter and a value of the second counter for the set of prefetch-based categories of cache lines.

In an example, the first cache control means is to associate the first priority indicator with a third line of the first cache memory of a first prefetch-based category of the set of prefetch-based categories of cache lines in response to a comparison result between the value of the first counter and the value of the second counter associated with the first prefetch-based category that exceeds a threshold.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE- PROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a first cache memory to store a first plurality of cache lines;
   a first cache controller to control the first cache memory, the first cache controller including a replacement circuit to:
      associate a first priority indicator with a first cache line based on storage of demand data in the first cache line and first learning information associated with a set of demand-based categories of cache lines; and
      associate a second priority indicator with a second cache line based on storage of prefetch data in the second cache line and second learning information associated with a set of prefetch-based categories of cache lines;
   a second cache memory to store a second plurality of cache lines; and
   a second cache controller to control the second cache memory, the second cache controller including an eviction circuit to identify at least one of the second plurality of cache lines to evict to accommodate a cache line received from the first cache memory.

2. The processor of claim 1, wherein the first cache controller is to evict the first cache line and send the first cache line and the first priority indicator to the second cache controller.

3. The processor of claim 1, wherein the first learning information is independent of the second learning information, the set of demand-based categories of cache lines is independent of the set of prefetch-based categories of cache lines, and the first priority indicator is to indicate a higher priority than the second priority indicator.

4. The processor of claim 1, wherein the replacement circuit is to associate the first priority indicator with a third cache line that stores prefetch data when the third cache line was filled into the first cache memory from the second cache memory.

5. The processor of claim 1, wherein the second cache controller is to prioritize storage of cache lines that store demand data over storage of cache lines that store prefetch data.

6. The processor of claim 1, wherein each of the first plurality of cache lines includes a metadata portion to store metadata, the metadata portion including a prefetch field to store an indicator having a first value to indicate that the cache line stores prefetch data.

7. The processor of claim 6, wherein the first cache controller is to identify that the second cache line stores prefetch data based on the indicator of the prefetch field of the metadata portion of the first cache line having the first value.

8. The processor of claim 1, wherein the first cache controller includes an observer circuit to identify a plurality of observer sets of the first cache memory and to maintain a first counter and a second counter for each of the set of demand-based categories of cache lines and the set of prefetch-based categories of cache lines, the first learning information comprising a value of the first counter and a value of the second counter for the set of demand-based categories of cache lines and the second learning information comprising a value of the first counter and a value of the second counter for the set of prefetch-based categories of cache lines.

9. The processor of claim 8, wherein the first cache controller is to associate the first priority indicator with a third line of the first cache memory of a first prefetch-based category of the set of prefetch-based categories of cache lines in response to a comparison result between the value of the first counter and the value of the second counter associated with the first prefetch-based category that exceeds a threshold.

10. The processor of claim 9, wherein the first cache controller is to associate the second priority indicator with a fourth line of the first cache memory of a first demand-based category of the set of demand-based categories of cache lines in response to a comparison result between the value of the first counter and the value of the second counter associated with the first demand-based category that is less than the threshold.

11. The processor of claim 1, wherein the second cache controller is to bypass storage of the second cache line in the second cache memory based at least in part on the second priority indicator.

12. A machine-readable medium having stored thereon instructions, which if performed by a machine cause the machine to perform a method comprising:
   receiving, in a first cache memory of a processor, a cache line from a memory coupled to the processor in response to a memory request for data in the cache line;
   in response to determining that the memory request was a prefetch request, storing the cache line in the first cache memory and setting a bin identifier for the cache line to a first prefetch value to indicate that the memory request was the prefetch request;
   in response to determining that the memory request was a demand request, storing the cache line in the first cache memory and setting the bin identifier for the cache line to a first demand value to indicate that the memory request was the demand request; and
   updating the bin identifier for the cache line in response to the cache line being hit by a demand request while the cache line is stored in the first cache memory.

13. The machine-readable medium of claim 12, wherein updating the bin identifier for the cache line comprises updating the bin identifier for the cache line to a second prefetch value in response to the cache line being hit by a demand request while the cache line is stored in the first cache memory.

14. The machine-readable medium of claim 12, wherein the method further comprises:
   receiving a second cache line from a second cache memory of the processor coupled to the first cache memory; and
   setting a bin identifier for the second cache line to a reuse bin value to identify that the second cache line has a highest priority.

15. The machine-readable medium of claim 12, wherein the method further comprises:
   identifying the cache line for eviction from the first cache memory;
   accessing, based on a value of the bin identifier for the cache line, a first counter value and a second counter value associated with a bin category;
   processing the first counter value and the second counter value to generate a processed value;

associating a priority value with the cache line based at least in part on the processed value;

sending an eviction notification for the cache line to a second cache memory with the priority value.

16. The machine-readable medium of claim 15, wherein the method further comprises:

storing the cache line in the second cache memory with a first age indicator based at least in part on the priority value having a first level; and storing the cache line in the second cache memory with a second age indicator based at least in part on the priority value having a second level, the first age indicator to indicate a higher priority than the second age indicator.

17. The machine-readable medium of claim 15, wherein the method further comprises bypassing storage of the cache line in the second cache memory based at least in part on the priority value.

18. A system comprising:

a processor comprising:

a plurality of cores each including a first level cache memory; and a cache memory hierarchy coupled to the plurality of cores, the cache memory hierarchy including:

the first level cache memory included in the plurality of cores;

a second level cache memory coupled to the first level cache memory; and a shared cache memory coupled to the second level cache memory, the shared cache memory including:

a first cache controller to prioritize maintenance in the shared cache memory of demand-based data over prefetch-based data, when the demand-based data has a higher hit rate in the shared cache memory than the prefetch-based data; and a system memory coupled to the processor.

19. The system of claim 18, wherein the second level cache memory comprises a second cache controller to:

associate a first priority indicator with a first cache line having the demand-based data and first access information associated with a first demand-based usage category; and associate a second priority indicator with a second cache line having the prefetch-based data and second access information associated with a first prefetch-based usage category.

20. The system of claim 18, wherein the first cache controller is to:

store in the shared cache memory first prefetch-based data evicted from the second level cache memory based at least in part on reuse of the first prefetch-based data after a prior storage in the shared cache memory; and bypass storage in the shared cache memory of second prefetch-based data evicted from the second level cache memory based at least in part on a priority indicator associated with the second prefetch-based data.

* * * * *